United States Patent [19]
Talbott et al.

[11] Patent Number: 5,113,500
[45] Date of Patent: May 12, 1992

[54] MULTIPLE COOPERATING AND CONCURRENTLY OPERATING PROCESSORS USING INDIVIDUALLY DEDICATED MEMORIES

[75] Inventors: Jefferson F. Talbott, Orange; Richard A. Cowgill, El Toro; Chris R. Cummings, Mission Viejo; James A. Fontana, Mission Viejo; Anthony R. Pitchford, Mission Viejo, all of Calif.

[73] Assignee: Unisys Corporation, Blue Bell, Pa.

[21] Appl. No.: 397,620

[22] Filed: Aug. 23, 1989

[51] Int. Cl.[5] .............. G06F 15/16; G06F 13/14
[52] U.S. Cl. .................. 395/325; 364/239.3;
    364/228; 364/232.3; 364/232.8; 364/927.81;
    364/927.83; 364/933.8; 364/939.2; 364/DIG. 1
[58] Field of Search ... 364/200 MS File, 900 MS File

[56] References Cited

U.S. PATENT DOCUMENTS

| | | | |
|---|---|---|---|
| 4,530,052 | 7/1985 | King et al. | 364/200 |
| 4,591,975 | 5/1986 | Wade et al. | 364/200 |
| 4,679,166 | 7/1987 | Berger et al. | 364/900 |
| 4,722,048 | 1/1988 | Hirsch et al. | 364/200 |
| 4,747,040 | 5/1988 | Blanset et al. | 364/200 |
| 4,882,674 | 11/1989 | Quint et al. | 364/200 |
| 4,920,481 | 4/1990 | Binkley et al. | 364/200 |
| 4,945,470 | 7/1990 | Takahashi | 364/200 |

Primary Examiner—Thomas C. Lee
Assistant Examiner—Ken S. Kim
Attorney, Agent, or Firm—Alfred W. Kozak; Mark T. Starr

[57] ABSTRACT

A personal computer (PC) desktop workstation using a first operating system is enhanced with a single PC bus extension card (SCAMP Board) within its base housing which connects a second computer system (A-Series) having a large memory, control logic and a 2-inch × 2-inch IC chip module holding a CPU and control store. The first operating system is organized to act as the I/O and peripheral subsystem for the second computer system so that peripheral connectivity, operational and maintenance interfaces can function with a PC keyboard, screen and peripheral devices. The workstation base housing has a footprint of less than three square feet and six inches height while providing memory and processing ability comparable to mainframe computers which are normally several volumes larger in size.

5 Claims, 8 Drawing Sheets

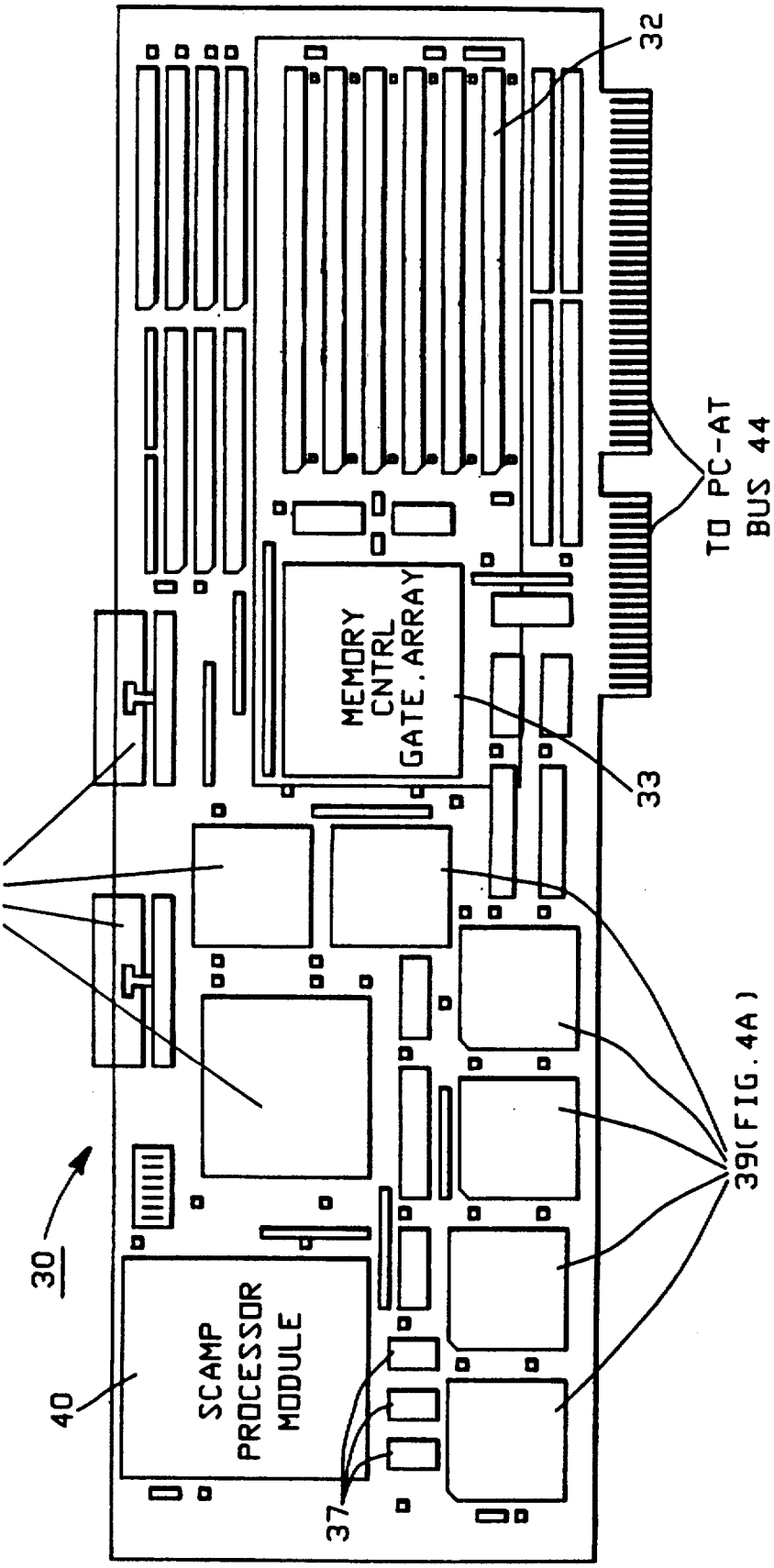

MULTIPLE COOPERATING AND CONCURRENTLY OPERATING PROCESSORS USING INDIVIDUALLY DEDICATED MEMORIES

FIELD OF THE INVENTION

This disclosure relates to computer systems having the nature of mainframe computer capability while being configured in a small unitary desktop module.

BACKGROUND OF THE INVENTION

The history of computer mainframes has been a gradual, over-the-years, diminution of module space. From the early computer systems of ten to 15 years ago which required the space of an entire room to house its contents, through the later updated technology which brought them down to a series of large cabinets, to the recent advances in packaging and integrated circuit chip technology which has permitted mainframe-capability computers to be brought down to the size of a 3-foot high file cabinet, the drive to space diminution continues.

With the advance of shrinking techniques and high-density memories plus high-density developed integrated circuit chips, the present mainframe configuration has been reduced to the size of a desk-type typewriter module configuration, but still includes all the capabilities and versatility of the established mainframe computer systems.

It is an object of the described innovative configuration to provide all the extended capabilities of a mainframe computer system into a module arrangement which can sit on top of a desk and which can be confronted and operated by an operator as if it were a typewriter.

It is an object of the described configured system to provide a small, modular, desktop, mainframe-type computer which requires no special air conditioning and uses standard power connections directly from an ordinary wall socket.

It is also an object of the invention to provide a small-volume, low-cost, desktop system which provides software compatibility with users who have already invested in software, developed for Unisys A-Series computers.

It is an object of the present invention to provide a cost-efficient, desktop computer system which can support from one to ten (or more) interconnected users.

It is an object of the present invention to provide a cost-efficient, desktop mainframe computer which provides ease-of-use features for use in a distributed data processing environment.

It is an object of the present computer system to provide standard communications to other workstations and for interconnections to other host computer systems including Ethernet, Star, LAN, ISO/OSI, TCP/IP, SNA (Systems Network Architecture), BSC (Binary Synchronous Communication), and X.400.

It is an object of the present computer system to provide industry-standard peripheral interfaces such as the small computer systems interface (SCSI).

It is an object of the present system to provide object code compatibility with other Unisys A-Series computer systems.

It is an object of the present invention to provide complete software compatibility with Unisys A-Series software programs and to provide a workable interface between the processor in the personal computer portion and the newly developed A-Series microchip processor (SCAMP) SCAMP is an acronym for Single Chip A-Series Mainframe Processor. This includes the ability to access PC (personal computer) attached peripherals and devices from the A-Series processor (SCAMP) and gateways to communication environments such as Ethernet, Token Ring, and Star LAN.

It is an object of the present invention to provide a user interface to the desktop system which has the look and feel of operating a PC which includes pull-down menus, windows, Icons and also mouse support.

For operation of the previously developed Unisys A-Series systems, reference may be made to a Unisys publication entitled *A Series Burroughs Network Architecture (BNA), Version 2—Operations Reference Manual,* Volumes 1 and 2, Form No. 1188018, dated December 1987 from Unisys Corporation, Plymouth Distribution Center, Plymouth, Mich.

Included by reference herein are Unisys patents which described the Unisys A-Series type of Data Link Processors (DLP), Message Level Interface (MLI), Connection Modules, and Base Module devices. These include U.S. Pat. No. 4,280,193, entitled "Data Link Processor for Magnetic Tape Data Transfer System", and U.S. Pat. No. 4,390,964, entitled "Input/Output Subsystem Using Card Reader Peripheral Controller".

SUMMARY OF THE INVENTION

The present computer system implemented in a desktop module configuration is designated as the "Micro A". The Micro-A is a single processor desktop system in the family of Unisys A-Series systems. The Micro-A is based on a single chip A-Series microprocessor called the SCAMP and is housed in a Unisys Personal Workstation Model 800 (PW2-800) system.

The Micro-A system is code-compatible with all other Unisys A-Series systems and the Unisys standard A-Series MCP/AS software (master control program/advance systems) runs on a PC board called the SCAMP board which connects into the bus of the PW2-800 workstation which operates as a PC (Personal Computer).

The I/O and maintenance functions of the Micro-A are handled by special software (Micro-A Server software) which runs on the PW2-800 workstation processor under the Microsoft ® OS/2 operating system.

The Micro A system (which is also designated as the Unisys A0 computer) supports Small Computer Standard Interface (SCSI) disk and tape devices which connect to the system via a SCSI Host Adapter board which plugs into the bus of the PW2-800. A minimum of one 280 MB fixed disk and one 150 MB cartridge tape drive is packaged with each system.

Other peripherals for attachment in the Micro-A system include the PW2-800 (monochrome or enhanced color) monitor display, a keyboard, and printers compatible with the PC. These devices are controlled by the Microsoft operating system OS/2, which together with the Micro-A server software, functions as the I/O processor for the Micro-A system. A 1.2 MB floppy disk drive and a 20 MB hard disk are provided for use by the OS/2 operating system and the Micro-A server software (the A-Series software cannot directly access these devices).

All of the peripherals fit inside the personal workstation desktop cabinet except for the monitor, the keyboard, and printer. Optional "external" peripherals include tape drives, a DP-1000 document processor, datacomm terminals and printers, and disk/cartridge tape expansion cabinets.

Terminal and host-to-host data communications are provided by use of a datacomm co-processor board which plugs into the PW2-800 bus. Standard A-Series datacomm and BNA (Burroughs Network Architecture) software control the networks.

BRIEF DESCRIPTION OF THE DRAWINGS

FIG. 4B is a plan view of the internally mounted SCAMP board holding an A-Series computer system;

DESCRIPTION OF PREFERRED EMBODIMENT

Figure 1:
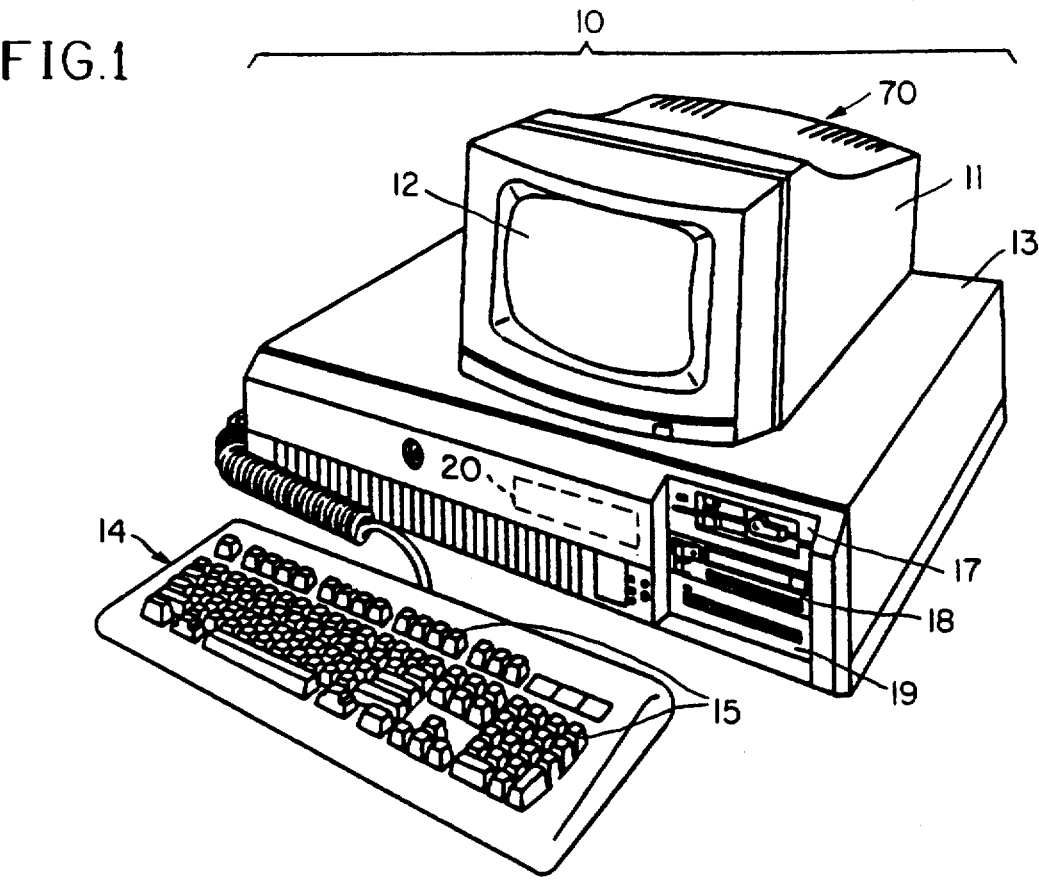
FIG. 1 is a drawing of the housing for the desktop mainframe computer showing the various sections thereof.

The desktop mainframe computer is a fully compatible member of the Unisys Corporation's family of general purpose information systems known as A-Series family. This desktop mainframe computer designated as the Micro-A is designed around the single-chip, A-series mainframe processor known by the acronym SCAMP which is a single module processor package which encompasses a 48-bit microprocessor and ten 256K-bit static RAM chips.

This multi-chip package and 12 megabytes of system memory are mounted on a printed circuit board that is integrated into a Unisys Personal Workstation-2 Model 800 Personal Computer (PC). The PC operates with the Microsoft Operating System OS/2 and the PC serves as Input/Output control and as a maintenance subsystem for the Micro-A computer system.

There are two classes of components in the Micro-A computer system which may be designated as the A-Series Mainframe Components and as the PW2-800 Personal Computer System components.

The A-Series mainframe components (first group) include:

A1: SCAMP/12 MB Processor/Memory Board which is the A-Series central processing unit.

A2: A small computer systems interface (SCSI) Adaptor Board.

A3: A Data Communications Host Adaptor (DCHA) Board (together with one extra expansion slot left open for a second DCHA board).

A4: A 280 MB in-built SCSI disk.

A5: A 150 MB SCSI Cartridge Tape Drive (¼ inch).

The items A2-A5 are generally available commercially for purchase from vendors.

The printed circuit board called the SCAMP board also contains the I/O bus control that communicates with the PC bus. The SCAMP connects into one expansion slot.

The SCSI board can support a maximum of seven SCSI devices on a cable length of up to 18.5 feet.

The DCHA (Data Comm Host Adapter) is based on a board using the Intel 80286 processor as a co-processor with the addition of 512 KB of dedicated memory. The DCHA operates on Unisys firmware and supports up to four separate lines using RS232 connectors and can run a minimum of three communication protocols concurrently.

The SCAMP Microprocessor of the Micro-A System employs a standard Unisys A-Series Master Control Program/Advance System (MCP/AS) operating environment providing an application interface with other A-Series systems and which allows users to distribute A-Series resources to customer applications.

The second group of components involving the PW2-800 Personal Computer System includes the following:

P1: An Intel 80386 Microprocessor, together with a 16 MHz input/output processor with 1 MB of memory.

P2: A 2 MB memory expansion board.

P3: A 20 MB hard disk.

P4: A 5¼ inch Floppy Disk Drive (1.2 MB).

P5: A Hard Disk Controller Board.

P6: An enhanced graphics adaptor board (EGA).

The 20 MB hard disk acts as a boot device for the Microsoft ® Operating System OS/2 and for the Micro-A Server software. The hard disk and the 1.2 MB floppy disk are for the exclusive use of the workstation I/O subsystem and are not accessed by the MCP/AS of the A-Series SCAMP microprocessor. The OS/2 PC subsystem can be utilized in the PC mode, but only when the Micro-A unit's SCAMP microprocessor is off-line.

In prior existing A-Series mainframes, a particular proprietary circuit board was used to control the peripherals such as the printer, tape drive, disk drive, etc. In the Micro-A Desktop Computer, there is provided a system in which "software programs" running on OS/2 can perform the same functions as the priorly used circuit boards, which operated as industry-standard personal computer (PC) input/output controllers.

In the search for an operating system which could run on the PC workstation, which would also permit an A-Series Mainframe I/O subsystem to be emulated in software, it was found that the Microsoft ® OS/2 operating system could be used for this purpose. The multitasking nature of the operating system allows the complex A-Series I/O subsystem to be emulated in software, and the actual I/O operations to be performed by standard PC hardware under control of a standard PC operating system.

Condensation in volume of electronic components was effectuated in order to sharply reduce the volume requirements. For example, in the prior Unisys A3 mainframe computer system, 12 MB of memory would require four full printed circuit boards, each one having the size of 11×14 inches. However, with the newly developed packaging arrangements for memory systems, a method was developed for mounting memory chips on cards which chips could sit vertically on the PC AT expansion board in a double-decker style so that 12 MB of memory could be packaged in the space involving only 3½ inches by 2½ inches.

The Micro-A is organized as a desktop or a sidedesk, single processor A-Series system which is housed in a Unisys Personal Workstation Model 800 cabinet. The Micro-A configuration uses a standard A-Series operating system called the master control program (MCP/AS) and PW2-800 monitor is the console for the Micro-A.

The entire Micro-A configuration can be housed horizontally in 2.67 square feet and vertically in 1.28 square feet.

This diminution in volume of the required modular space for a mainframe computer is a substantially unique and versatile configuration which is even less than one-third the floor space of the entry-level mainframe computer known as the A1 Series of the Unisys Corporation. The PW2-800 personal workstation cooperates to function as the maintenance and the I/O processor for the Micro-A configuration. The PW2-800 is driven by a 16 MHz Intel 80386 processor and the main cabinet contains 3 MB of main memory, a 20 MB hard disk and a 1.2 MB floppy disk drive.

All of the I/O, data communications and maintenance functions are performed by software designated ,as Micro-A Server software which involve a set of PC programs that run under control of the OS/2 operating system which is developed from the Microsoft ® software.

The main memory of the PC is for the exclusive use of OS/2 and the Micro-A Server software, and this memory is not accessible by the master control program/advance system.

Figure 2:
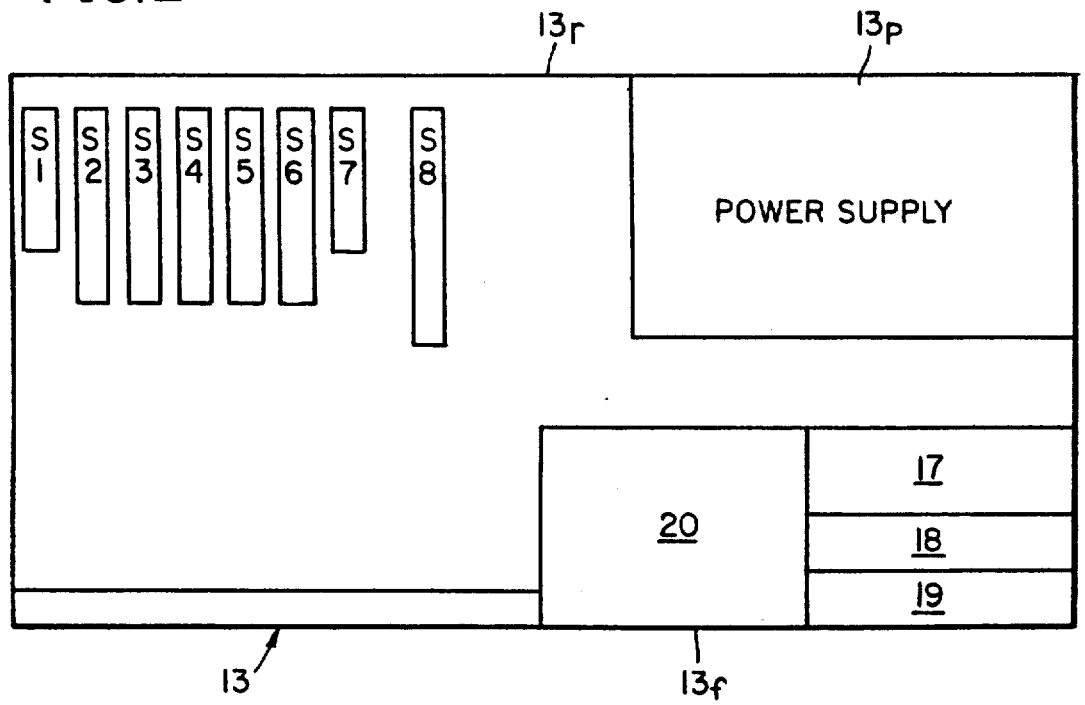
FIG. 2 is a top plan view of the locations of the functional printed circuit boards, power supply and peripheral units between the cabinet front and cabinet rear.

There are expansion slots in the main cabinet 13 which is shown in the plan view in FIG. 2 and use standard PC/AT boards which plug into the expansion slots of the main cabinet. Each board will contain one of the follow co-processors:

(a) An A-Series processor board, called SCAMP which uses a high-density, complimentary metal oxide semiconductor (CMOS) technology to place the entire 48-bit A-Series architecture (equivalent of 10,300,000 transistors) on a single chip. A single, plug-in board designated as the SCAMP board contains the Micro-A central processor chip $40_{ip}$, plus 12 MB of A-Series system memory $40_m$ of FIG. 5 and I/O controls necessary for communicating with the main personal workstation bus 44 of FIG. 3.

Figure 5:
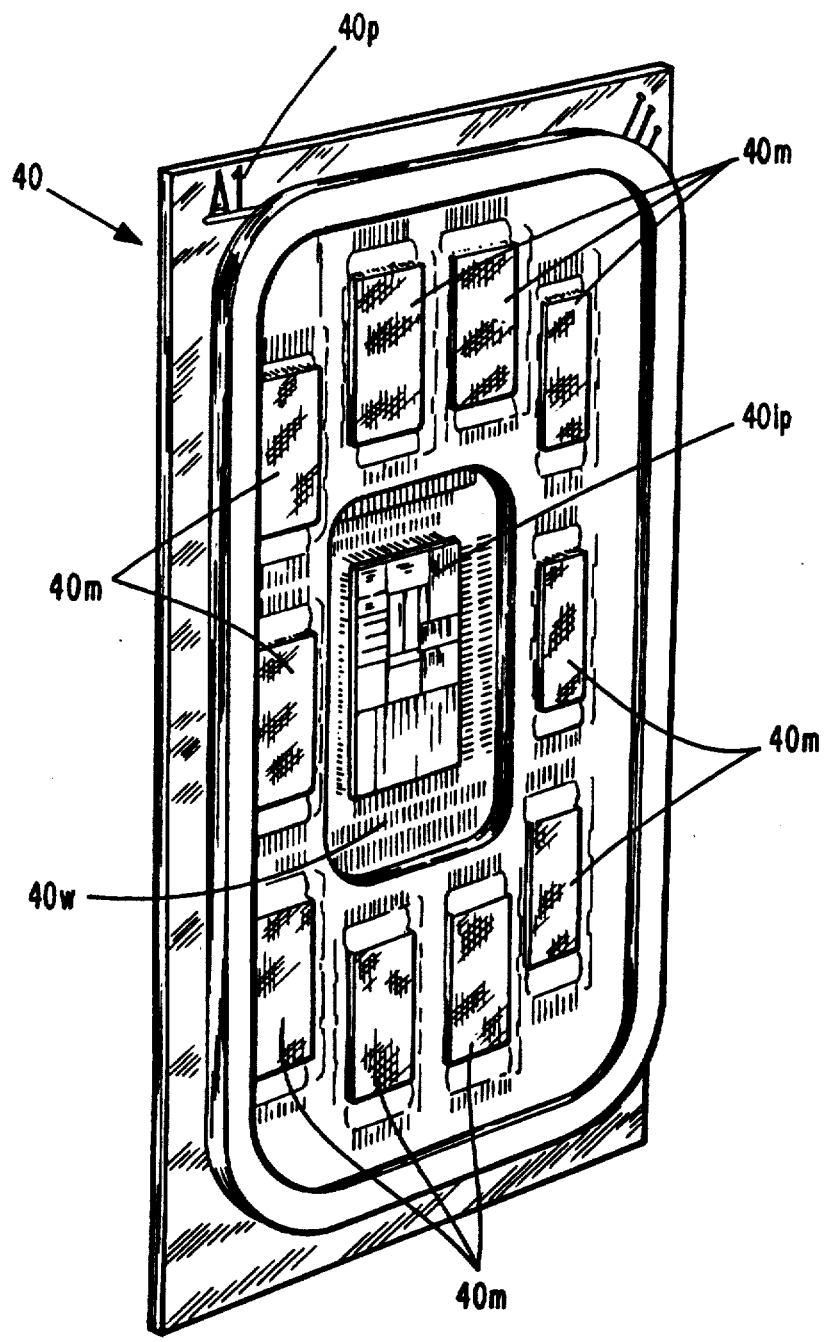
FIG. 5 is a diagram showing the SCAMP processor chip module having the central die processor unit surrounded by a series of control-memory chips.

When unbridled by memory or I/O, a single chip SCAMP processor $40_{ip}$ of FIG. 5 can deliver performance of 40 RPM (relative performance measurement). Overall the system is designed to handle from 10-16 users concurrently.

As an example of the evolutionary development in miniaturization of mainframe processors, the earlier Unisys B5899 originally required a large-size printed circuit board, of 11 inches by 14 inches which involved the multiple number of chips. Subsequently, Unisys Series A-3 computer systems developed its processor using gate arrays which involved 20 chips. Subsequently, the later developments of the Unisys Series A-5 involved only 12 chips; and the present development using the SCAMP microprocessor is placed entirely on one single chip.

Referring to FIG. 1, the Micro-A desktop computer system is seen in its external appearance as a desk-type module 10 having a screen monitor 70 provided by a top casing 11 and a window display 12. The lower case 13 will be seen to include a 1.2 MB floppy disk drive 17, a SCSI cartridge tape drive 18, and OS/2 disk drive 19 and a SCSI disk drive 20.

In FIG. 1 there is seen a standard keyboard 14 with specialized areas of function keys at 15.

Referring to FIG. 2, there is a top plan view of the inner arrangement of the cabinet 13. The cabinet front is designated as $13_f$ and the cabinet rear is designated $13_r$. Shown by approximate location are the power supply unit 13P, a series of slots S1 through S8 for printed circuit boards and the floppy disk drive 17, the cartridge tape drive 18, the OS/2 disk drive 19 and the SCSI disk drive 20. The slot S1 houses a printed circuit board for the Enhanced Graphics Adaptor (EGA) while slot S2 provides for a hard disk controller. The slot S3 is a spare slotted area while slot S4 houses a datacomm controller. The slotted area S5 holds the SCSI Host Adapter while the SCAMP Board and its components is housed in slot S6. Since components attached to the SCAMP board in S6 extend for some distance over the slot S7 area, the slot S7 is not used. The slot S8 is used to house the personal workstation PW2-800 memory expansion card.

Figure 3A:
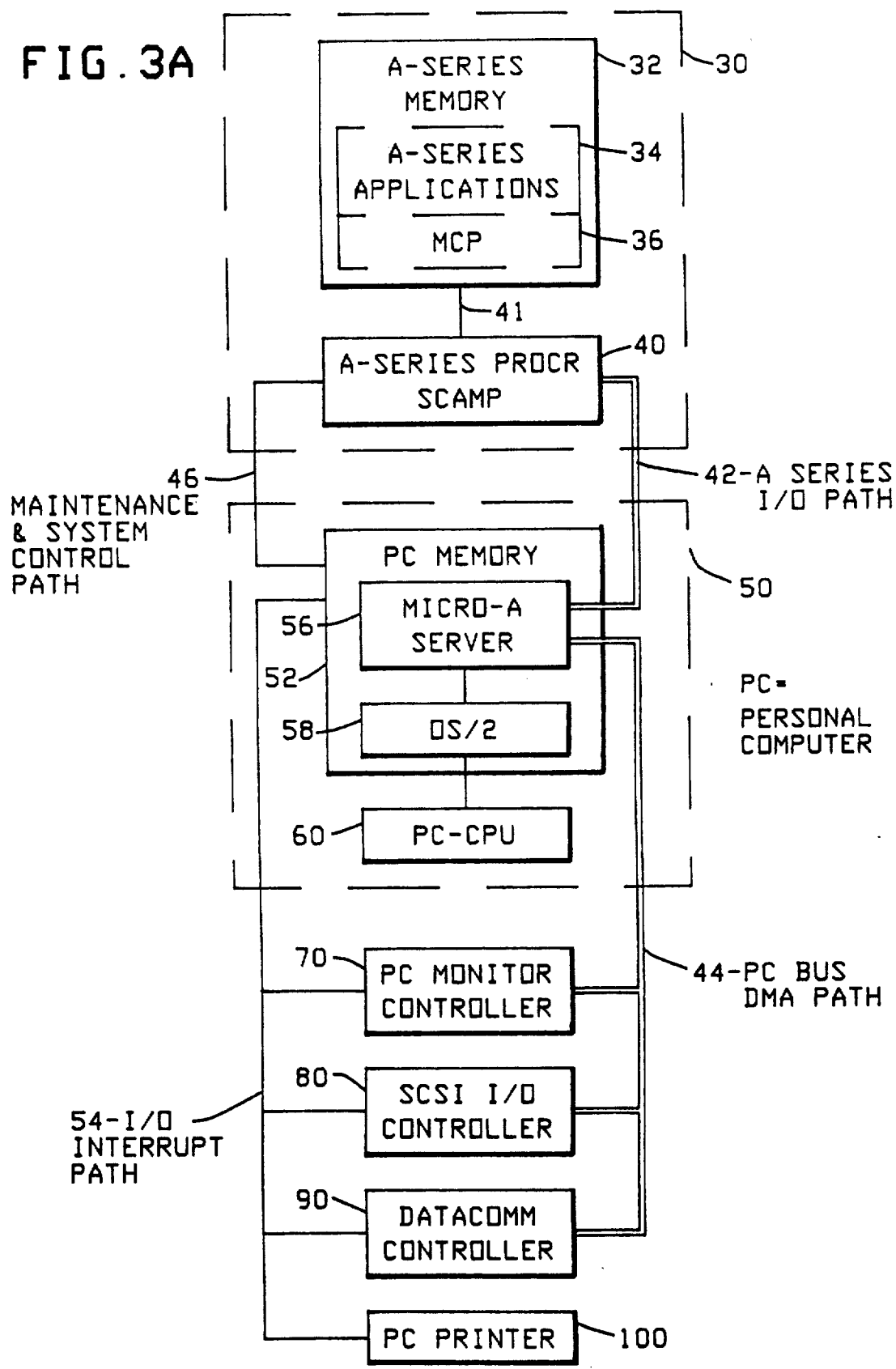
FIG. 3A is a block diagram showing the basic operating units of the PC computer and A-Series computer and their interconnections.

FIG. 3A is a functional block diagram of the desktop Micro-A computer system.

The hardware platform for the Micro-A desk-type computer system is provided by the PW2-800 personal computer workstation unit. This system is housed in a full-sized, PC/AT-style cabinet and has a 16 MHz Intel 80386 central processing unit, 1 MB of memory on the motherboard and a 1.2 MB floppy disk drive. The PW2-800 provides five 16-bit expansion slots, two 8-bit slots, and one 32 bit slot for memory expansion. There are two serial ports and one Centronics parallel port. The cabinet itself has room for full-height 5¼ inch peripherals in addition to the half-height floppy disk drive.

The personal, computer (PC) workstation memory is shown in FIG. 3A as PC memory 52 which is used to house the software for the Microsoft ® OS/2 operating system 58 and also for the Unisys Micro-A Server software 56 which runs on the PW2-800 personal computer workstation. The PC workstation microprocessor is designated as PC CPU 60 in FIG. 3. The memory components 52, 56 (Micro-A Server) and the OS/2 software 58 are shown within the personal workstation unit 50. The personal workstation unit 50 has an I/O bus 42 which connects to the SCAMP chip 40. It also has a DMA direct memory access path 44 connecting the unit 50 to the monitor screen controller 70, the SCSI I/O controller 80, and the datacomm controller 90.

Additionally, the personal workstation unit 50 (often designated as "PW" for Personal Workstation) is the unit which constitutes the PC (Personal Computer) environment. This includes a bus 44 which connects it to the peripherals 70, 80, 90, and 100. Bus 46 connects PC unit 50 to the A Series SCAMP chip 40 while bus 42 is the I/O bus of the processor 40.

The SCAMP chip 40 is connected to the SCAMP memory board 30 which includes the SCAMP memory 32, the software for A-Series applications 34 and the master control program (MCP) software 36.

Figure 4A:
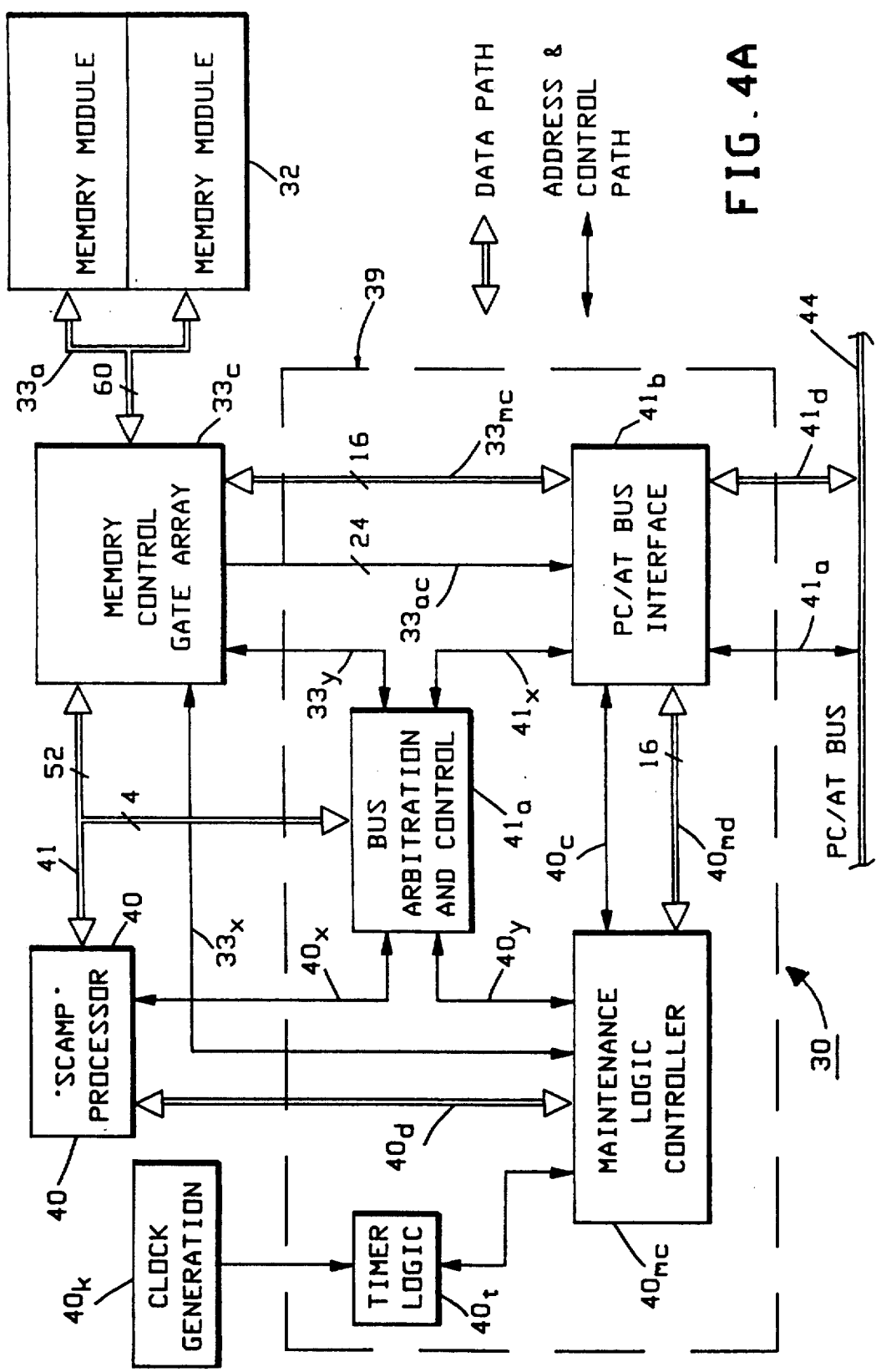
FIG. 4A is a block diagram of the architecture of the internal SCAMP processor board.

The SCAMP board hardware architecture 30, in block diagram, is shown in FIG. 4A and FIG. 4B and indicates the physical layout. Here the SCAMP chip 40 is connected to a 52-bit SCAMP bus 41. This bus utilizes a bus arbitration controller $41_a$ and also connects to a memory controller $33_c$. The memory controller $33_c$ has a bus connection to the A-Series memory 32 and the 16-bit bus connection $33_{mc}$ which connects to the PC workstation PW2-800 on bus 44 via the bus interface 41$_b$.

The SCAMP chip 40 also connects via bus 40$_d$ to a maintenance logic controller 40$_{mc}$ which then connects on bus 40$_{md}$ and 41$_d$ to the personal workstation bus 44. The bus arbitration controller 41$_a$ operates to control the PC bus interface controller, 41$_b$ to provide an output to the personal workstation bus 44. The personal workstation PW2-800 has a 2 MB memory expansion board that plugs into the 32-bit slot S8 of FIG. 2. This board can support up to 8 MB of memory but is only populated up to 2 MB. By including the motherboard memory, the overall Micro-A system requires a minimum PW2-800 memory size of 3 MB.

The Enhanced Graphics Adapter (EGA) controller which fits into the 8-bit slot S1 of FIG. 2 can operate in either monochrome or enhanced color mode depending on the type of monitor 70 attached to it.

The monitor or so-called monitor-window screen unit 70 of FIG. 1 (including the container 11 and window screen 12) is used as the Maintenance Display Terminal (MDT), as the Operator Display Terminal (ODT) and also as an applications terminal.

The keyboard 14 of FIG. 1 is mapped to a Unisys TD/MT-style keyboard by the software.

As previously discussed, the PC workstation PW2-800 provides the base structure for configuring the Micro-A system such that additional boards are plugged into the PW2-800 bus 44 of FIG. 3 and 54 of FIG. 3A, and additionally, the peripherals are inserted into the full-height 5¼ inch cabinet slots 17 and 18 of FIG. 1.

Figure 3B:
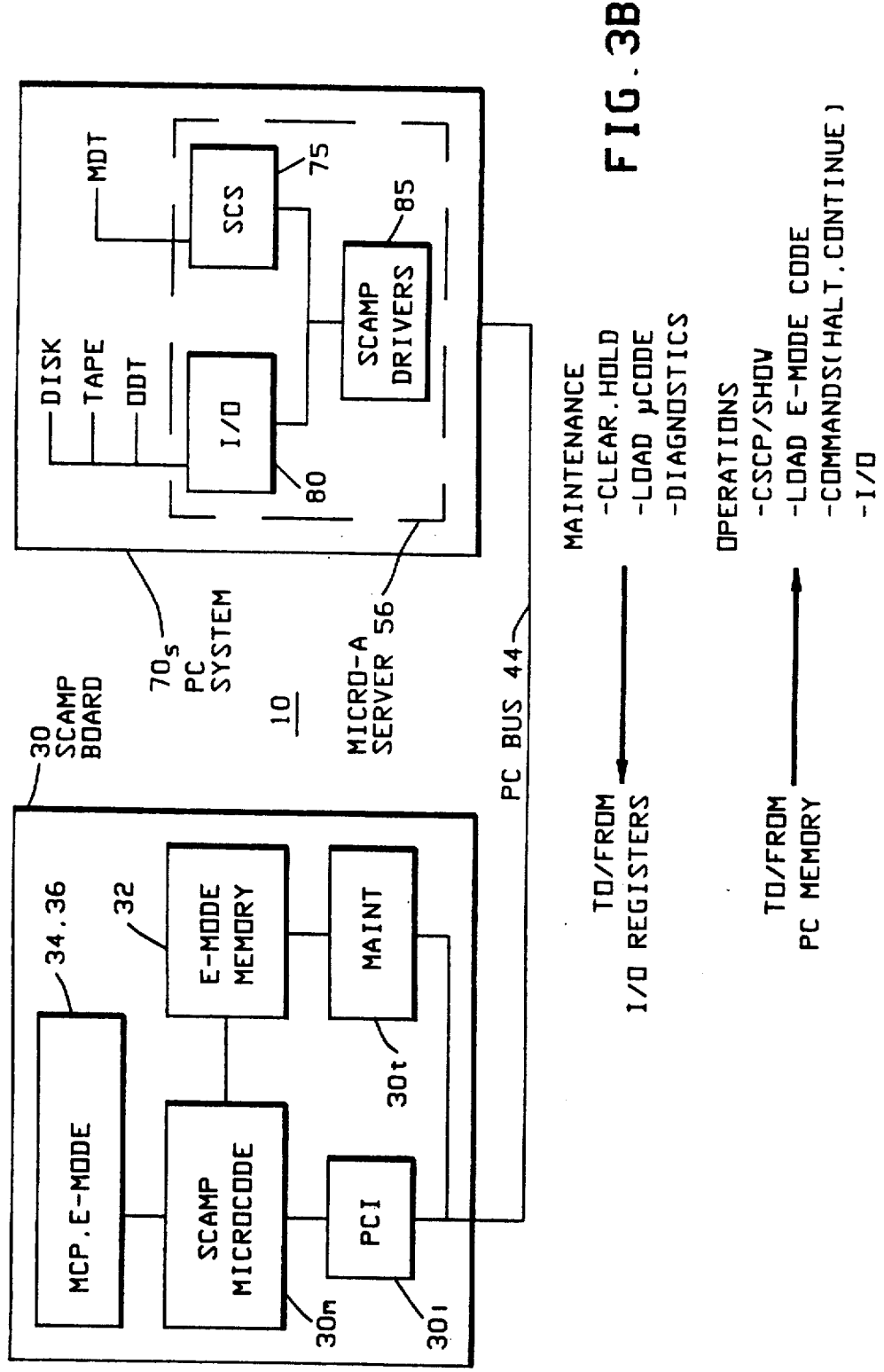
FIG. 3B is a layout illustrating the basic software structure.

The SCAMP board 30 is seen to plug into the 16-bit slot S6 of FIG. 2 which connects it to the PW2-800 bus 44 of FIGS. 3A, 3B. The key component of the SCAMP board 30 is the SCAMP package chip 40 which contains the A-Series processor chip and the microcode store which surrounds it as seen in FIG. 5. The microcode implements the Unisys A-Series E-Mode level Beta instruction set. Additionally, on the SCAMP board 30 (FIG. 3B) there are 12 MB (2 megawords) of A-Series memory, thus the hardware mechanism is needed to communicate with the PW2-800 bus 44. Since certain of the components on the SCAMP board 30 extend outward and overlap the space of slot 7 (FIG. 2), the SCAMP board occupies the space of two expansion cards even though it only plugs into one slot.

The memory controller 33$_c$, FIG. 4A, on the SCAMP Board 30 can correct single-bit memory errors and can detect and report (but not correct) double-bit memory errors. The Error Correction Codes (ECC's) are held in an additional 3 MB of memory on SCAMP Board 30, for an overall total of 15 MB of main memory for the microprocessor 40. The 3 MB of ECC memory are not accessible by software.

In FIG. 3A, the SCSI Host Adaptor Board 80 plugs into the slot S5 (FIG. 2) which is a 16-bit PW2-800 bus slot. It can drive a maximum of seven single-ended SCSI devices. The SCSI bus is terminated with a plug-on device.

The 280 MB SCSI disk drive 20, which is shown in FIGS. 1 and 2, is installed in the middle-front of the PW2-800 cabinet. It is formatted in A-Series standard sectors of 180-byte sectors and is attached to the SCSI Host Adapter 80 (slot S5) with a ribbon cable.

The SCSI cartridge tape drive 18 shown in FIGS. 1 and 2 is a front-loading, half-height device that is installed underneath the floppy disk drive 17. The cartridge tape drive is attached to the SCSI Host Adaptor (slot S5) with the same ribbon cable as that attached to the disk. This device functions as a primary load/dump device for A-Series software and is only accessible by the master control program's (MCP's) LIBRARY/MAINTENANCE utility.

The OS/2 hard disk 19 of FIGS. 1 and 2 is a 20 MB hard disk controlled by the standard PW2-800 hard disk controller. This drive is mounted under the SCSI cartridge tape drive 18. The hard disk 19 is used only by OS/2 and personal computer applications, but is never accessed by the MCP of the A-Series processor.

The datacomm controller 90, located in slot S4 of FIG. 2 is a co-processor board using an Intel 80286-based processor with 512 kilobyte's (KB) of memory which plugs into the PW2-800 bus 44 and bus 54 of FIG. 3. In addition to software running on the PW2-800, the datacomm subsystem presents itself to the A-Series software as a datacomm-datalink processor (DC-DLP). Data Link Processors of this nature are described in Unisys U.S. patents such as U.S. Pat. Nos. 4,390,964; 4,392,207; 4,415,986 and are included herein by reference.

Although the co-processor board supports four lines by means of four externally accessible RS232 connectors, a maximum of three protocols can be run simultaneously on the datacomm board in slot S4. For example, the TDI poll/select protocols could run on lines 1 and 2, the AP-92 on line 3 and the BDLC protocol on line 4. The following pre-packaged datacomm protocols are designed to be supported: (a) TDI Poll/Select; (b) AP-92 (92xx printers); (c) RJE2780; (d) BDLC BNA V1; (e) DP1000 Protocol (to control DP1000 document processors).

It will be noted from FIG. 2 that after all the required components have been installed, there still remain one 16-bit PW2-800 bus slot at S3 which is still available for additional usage. Space is provided for installation of a second datacomm board for a total of eight datacomm lines and six different line protocols.

The Micro-A System software consists of the E-Mode software which includes SCAMP Microcode and the MCP and the Micro-A Server software which runs on the PW2-800. The software is placed on cartridge tapes and on 1.2 MB floppy disks.

The SCAMP microcode executes E-Mode level Beta operators. Microcode, for certain privileged system operators involving I/O, in some cases, has been modified to function in the underlying PC hardware environment. The microcode communicates with the Micro-A Server software running on the PW2-800 via the PW2-800 bus. This scheme is totally transparent to the MCP.

Operating System/2: OS/2 is an operating system developed and licensed from Microsoft by Unisys for use on the PW2-800 system. OS/2 manages the multitasking, large memory environment required by PC applications such as the Micro-A server. It has a preemptive task scheduler which allows for efficient execution of complex, time-critical Micro-A Server tasks. There are provisions in OS/2 for the simple installation of custom-written device driver software routines which, in the case of Micro-A, control custom hardware devices such as the SCAMP board 30.

Micro-A Server: The Micro-A Server (56, FIG. 3A) is the application which provides system control, maintenance, and I/O services for the A-Series hardware and the MCP. The Micro-A Server communicates with the SCAMP board 30 via the PW2-800 bus 44 and bus 54. System control and maintenance functions, such as load microcode, halt/load, or similar to those of other A-Series systems are used and they are invoked automatically or manually via a set of menu-driven user interface screens.

For total compatibility with A-Series software, the Micro-A Server has an MLI (message level interface) Base Emulation module which contains soft data link processor emulation tasks; the data link processor emulations convert (Unisys Universal input/output) UIO-style I/O requests onto calls on device driver routines which communicate with the PC-style peripherals and datacomm controllers.

With reference to FIG. 5, there is seen the A-Series central processing unit $40_{ip}$ which is the central die of the SCAMP module 40. A series of ten Static RAM integrated circuit chips surround the central processor die and are designated as $40_m$.

The SCAMP package $40_p$, which is an acronym for Single Chip A-Series Mainframe Processor, resides on a base of approximately 2 inches by 2 inches and is on the SCAMP board 30 which is inserted at slot S6 of (FIG. 2). FIG. 4B shows the physical location.

The SCAMP chip provides the equivalent of 10,300,000 transistors on the surfaces of a ten-layer module which encompasses the SCAMP chip and ten surrounding memory chips which connect to the central die of the SCAMP microprocessor chip.

In FIG. 5, the SCAMP module 40 is the A-Series Central Processing Unit (CPU) of the Micro-A system. The SCAMP module 40 consists of: the SCAMP package $40_p$ (which is a 10-layer carrier which processes computer instructions); the ten Static Random Access Memory (SRAM) chips, $40_m$, which hold the microcoded instructions; and multiple chip interconnect wires, $40_w$, which connect SRAM's $40_m$ to the SCAMP chip, $40_{ip}$, to the Input/Output pins of the SCAMP module 40. (The I/O pins are not shown).

The I/O pins provide the means by which the SCAMP module 40 communicates with other elements of the SCAMP Board 30 (FIGS. 4A, 4B).

The 11 chips in the SCAMP Module 40 contain the total equivalent of 10,300,000 transistors.

When the MCP (Master Control Program for A-Series Processors) is running in its usual multi-program, multi-user mode, the system looks and behaves like other Unisys A-Series systems. The PW2-800 monitor screen is used as either an operator display terminal (ODT) or a MARC (menu-assisted resource control).

The Micro-A Server software (56, FIG. 3A) runs continuously in the PC, executing I/O commands from the MCP while responding to system control requests such as reading the PC's battery-backed-up time and date. The fact that these operations are being performed by the PC software is totally transparent to the MCP.

The Micro-A Server software also monitors the SCAMP board 30 for failures. The Server periodically interrogates the board to verify its operation.

When the user presses both the "Alt" and the "Esc" keys on the monitor keyboard, the Micro-A Server operator menu appears on the screen while the MCP continues to run. From this screen, several menus are provided to allow low-level manipulation of the system. For example, the SCAMP board self-test can be manually initiated from the maintenance screen.

In addition to the various tests provided by the PW2-800, the Micro-A maintenance is provided by inbuilt self-tests such as the PW2-800's power-on motherboard self-test and down-loadable self-test and diagnostic tests, for example, on the SCAMP board. The objective of each test is to isolate a problem to a single customer-replaceable unit (CRU) or to a field-replaceable unit (FRU).

The Micro-A Single-Chip A-Series Mainframe Processor (SCAMP) contains a 48-bit microprocessor and ten 256K-bit static RAM chips. It features CMOS technology with very large scale integration (VLSI).

The PW2-800 serves as the maintenance subsystem for the Micro-A configuration.

The particularly valuable design combines a 48-bit mainframe CPU and 12 MB of main memory on a single board within a standard Unisys PC. The Micro-A uses the standard A-Series master control program advance system (MCP/AS) using the same code which runs on other A-Series systems. It is totally object-code compatible with all A-Systems. This compatibility is both upward and downward such that applications developed on the Micro-A can be run on smaller systems and larger systems at the high end of the Unisys A-Series such as the A-17.

The focal innovative concept of the Micro-A system is the transparent integration of two non-homogeneous operating environments, in this case, the master control program (MCP) and the Microsoft OS/2 operating system, all in a single module container for a desktop unit.

The SCAMP module 40 is a means to this end and the other cooperating features, which enable this miniaturized system, include:

1. The memory packaging, dual in-line memory modules (DIMM), FIG. 4B;
2. The transport mechanism between the SCAMP board 30 and the PC workstation's motherboard;
3. The UIO Emulation concept in the Server software;
4. The partitioning of the SCAMP board logic into areas which are implemented in custom CMOS gate arrays and areas which are implemented in Logic Cell Arrays (LCA's).

The cooperating inter-relationships of the five above-mentioned items enables the implementation of the Micro-A desk-type computer system. Thus, the innovative concept on which the described arrangements are focused is the double-environmental situation where two non-homogeneous operating environments are integrated.

Hence, there is a "companionship" of operating systems such that one companion system, such as described here, is the MCP working with OS/2. Similarly, there could be set into implementation other "companion" operating systems such as the MCP with UNIX.

Thus, with the cooperation of the companion environments, the A-Series facilities adds further value to the PC workstation while at the same time the PC workstation adds value to the A-Series companion system.

The system architecture is further delineated in connection with FIG. 3B. Since the Micro-A consists of the A-Series environment and the PC environment, the A-Series environment can be viewed as a layered hierarchy consisting of A-Series applications at the top, then system services (MCP, BNA, etc.) SCAMP microcode running on the SCAMP chip 40 and the SCAMP board 30 hardware at the bottom. Any hardware characteristics that are peculiar to the Micro-A are not known or reflected above the SCAMP microcode layer.

Low-level maintenance service such as testing the SCAMP board 30 and loading the SCAMP microcode generally use a simple scheme. The Micro-A Server 56 software (FIG. 3B) directly accesses special SCAMP board registers via the PW2-800 bus 44 using an I/O mapped address technique.

Run-Time services are provided for the A-Series environment by the PC environment. Services are accessed on or invoked via a communications protocol between the two environments. SCAMP microcode writes control messages across the PC bus $60_b$ and directly into a control area in the PC memory 52 of FIG. 3A, and then interrupts OS/2, and then resumes execution. The OS/2 sends vectors to the SCAMP driver 85, FIG. 3B, which invokes either the base emulation module or the system control module in order to perform the function called out in the control message.

The PC processor 60 never accesses the SCAMP board memory 32, FIG. 3A. The SCAMP board 30 accesses the PC memory 52 using the PC/AT bus master technique. PC memory refresh logic on the SCAMP board 30 allows extended ownership of the PC/AT bus 44 so that data can be transferred in bursts. While the SCAMP board 30 has bus mastership, the PC processor 60 is locked out from the PC bus 44 (FIGS. 3B, 4A).

A Series I/O Operations: To initiate an input/output operation, the MCP constructs an I/O Control Block (IOCB) that describes the operation, enqueues the IOCB and then starts the I/O in a standard Unisys A-Series fashion. SCAMP microcode then packetizes the relevant IOCB information, writes the message to PC memory 52 and interrupts the PC processor 60.

The interrupt is serviced by the SCAMP Driver 85, FIG. 3B, running on the PC. The message contains a function code which tells the SCAMP driver to invoke the I/O connection module software which is an emulation of the A-Series UIO Distribution Card and the Base Control Card.

The Unisys A-Series computer systems make use of input/output controllers which are called Data Link Processors (DLP). The background of host computer systems which use Data Link Processors for peripheral control has been discussed and described in such U.S. patents of Unisys Corporation as U.S. Pat. Nos. 4,370,730; 4,371,948; 4,386,415; 4,390,964; 4,534,013; and 4,602,331 which are included herein by reference.

Figure 6:
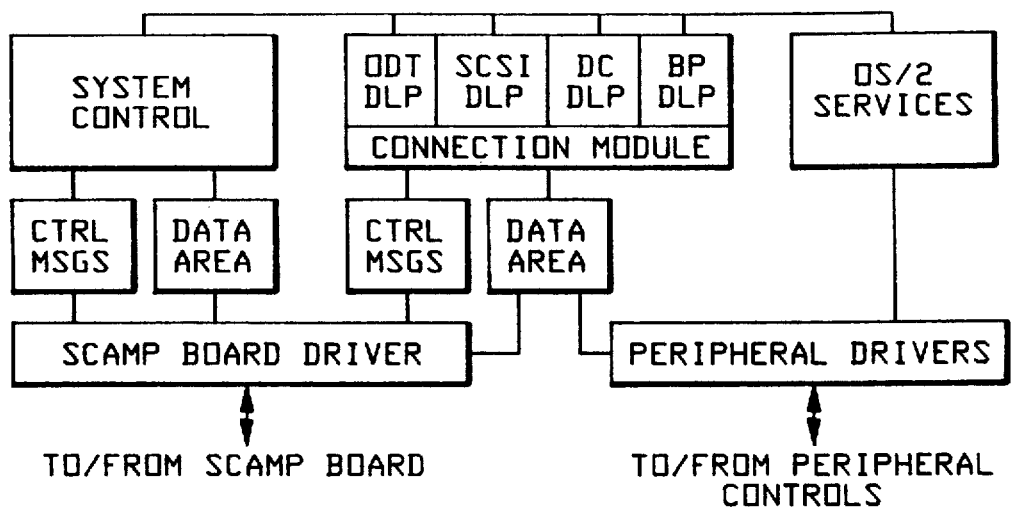
FIG. 6 is a diagram of the functional aspects of the server software of the desktop mainframe computer system.

The A-Series peripheral controllers known as Data Link Processors (DLP) are emulated by the AO Server software 56, FIG. 3B in the configuration shown in FIG. 6 where the previous hardware functions of the Data Link Processors is effectuated through software means. Thus the I/O commands and data to be transferred from the A-Series computer 30, are changed from their original format into a format compatible with the computer 50 to enable communication with the peripheral devices connected to computer 50.

The connection module (FIG. 7A) reads the Data Link Processor (DLP) address portion of the message and invokes the corresponding DLP emulator which interprets the DLP command and starts the actual I/O via its I/O device driver 80, FIG. 3B.

A-Series I/O output data is written to buffers in the PC memory 52. The data is sent to the designated peripheral (70, 80, 90, 100) by the DLP emulator running asynchronously in the PC processor 60.

The A-Series I/O input data is read into buffers in PC memory 52 by the DLP emulators (FIG. 5) which then interrupt the SCAMP board 30. The SCAMP microcode then reads the data from the PC memory 52 and writes the data into the SCAMP board memory 32.

At the end of the I/O operation, the DLP emulator translates the PC-style result descriptor into a DLP-style result, writes this result into PC memory 52, and then interrupts the SCAMP board 30. SCAMP microcode then reads the result from PC memory 52 and writes it into the IOCB result area in the SCAMP board memory 32. The microcode then enqueues the IOCB into the Result Queue and interrupts the MCP (Master Control Program) in its standard manner.

FIG. 3B shows the overall Micro-A system structure which involves the SCAMP board 30 and the PC system $70_s$. These two elements are connected by the PC bus 44.

Within, the SCAMP board 30 there is seen the master control program 34 connected to the SCAMP microcode which resides in the Static RAM memory of the SCAMP chip 40. The SCAMP board A-Series memory 32 (FIG. 3A) is indicated herein on FIG. 3B as the E-Mode memory 36. The SCAMP microcode connects to the PCI ($30_i$) (personal computer interface) and to the maintenance circuitry ($30_c$) which both connect to the PC bus 44.

The PC bus 44 connects to the PC system $70_s$ in which there resides the I/O subsystem 80 which connects to the disk unit 17, the tape unit and the operator display terminal 11.

In the PC there also resides the SCS, 75, FIG. 3B (System Control Subsystem) which connects to the maintenance display terminal (MDT) and also to the SCAMP driver 85.

The SCAMP board 30, SCSI controller 80, and the data communications controller 90 in FIG. 3A, are co-processors on standard PC/AT expansion cards, and they communicate with the eight-bit Intel ® 80386 microprocessor 60 over the workstation's bus 42. Off-the-shelf PC/AT-compatible expansion cards can provide interfaces to additional peripheral devices.

Users and operators of the Micro-A system get a fully functional PC/AT-compatible microcomputer as well as the powerful A-Series system. It may be noted that the personal workstation 10 which is the PW2-800, is also capable of running in the MS-DOS environment, but the A-Series processor is not able to run in that particular environment by itself.

The workstation's microprocessor 60 running the OS/2 operating system (58), acts as a maintenance and I/O processor for the Micro-A system, where its monitor 70 becomes the Micro-A operator's console. The A-Series mainframe computers use intelligent, microprocessor-based controllers which are called Data Link processors (DLP's), in order to control peripheral interfaces. In the Micro-A system, the PC hardware and the associated driver software are used to "emulate" the DLP's functionality, converting I/O requests from the SCAMP.

In the Micro-A system, the personal computer hardware and associated driver software "emulate" the DLP's functionality, converting I/O requests from the SCAMP processor 40 into the corresponding I/O activity on the workstation 10. In simple terms, the workstation's processor 60 provides the functionality of several A-Series DLP's.

At the heart of the architecture of the Micro-A system is the SCAMP processor 40 which is designated as the Single-Chip A-Series Mainframe Processor, which is a module developed for the desk-top computer. The SCAMP module is a complete implementation of the A-Series processor architecture located on a single, highly integrated, CMOS chip 40, FIG. 5. This 1.97-inch by 2.3-inch module (package dimensions), as shown in FIG. 5, includes over 10 million transistors. In previous generations of A-Series mainframes, these processors took up to two 10-inch by 14-inch circuit boards. The SCAMP processor 40 is intended to provide a high-performance platform for future Unisys entry-level and mid-level A-Series computers. The Micro-A system is the first product to incorporate the SCAMP chip and SCAMP board.

With reference to FIGS. 4A and 4B, it will be seen that the Micro-A system includes the SCAMP processor 40, the dedicated subsystem 39 (FIG. 4A) and interface logic $41_b$ (FIG. 4A) housed on a single PC/AT bus card, 30 (FIG. 4B).

Referring to FIG. 4A, there is seen a block diagram of the SCAMP board 30. The SCAMP microprocessor 40 is connected to the "OAK" memory control gate array which controls access to the memory module 32. The SCAMP processor 40 and memory control array $33_c$ connect to the memory subsystem 39. The memory subsystem 39 includes the bus arbitration and control circuitry $41_a$, the maintenance logic $40_{mc}$ and the bus interface $41_b$.

In the block diagram of the SCAMP board 30, FIG. 4A, the microprocessor 40, connects via bus 41 to the control gate array $33_c$ and to the memory subsystem 39. The memory control $33_c$ connects via bus $33_a$ to the dual in-line memory module (DIMM) 32 which is shown having two modules, each one holding 1 megaword with each word comprised of 60 bits.

The SCAMP processor 40 also connects via bus $40_d$ to the memory subsystem 39 into maintenance controller $40_{mc}$. The memory control $33_c$ connects via bus $33_{mc}$ to bus interface $41_b$.

The memory subsystem $39_c$ includes maintenance logic $40_{mc}$ which connects to the bus arbitration and control circuitry $41_a$ and to the bus interface circuitry $41_b$. An address control bus $41_a$ and a data bus $41_d$ connect to the PC/AT bus 44.

An on-board clock generator $40_k$ provides an output to timer logic $40_t$ which provides input to the maintenance logic $40_{mc}$.

Address and control buses are seen at $33_x$, $40_x$, $40_y$, $40_c$. Other address/control buses are seen at $33_y$, $33_{ac}$, $41_x$, and $41_a$.

The interconnecting buses are shown at 41, $40_d$, $40_d$, $33_{mc}$, $33_a$, $41_a$, and board PC/AT bus 44. The memory subsystem 32 of the Micro-A system 10 (DIMM memory subsystem) is 2 megawords deep where each memory word is 60 bits wide (40 data bits, 4 tag bits, and 8 ECC check bits). The memory array 32 is implemented with 120 1-MB DRAM devices. A condensed packaging system was developed which reduced the amount of board space required for the memory devices to less than 23 square inches. This packaging technology was given the name of "Dual-In Line Memory Modules" (DIMM) by placing the memory chips on small, thin, printed circuit boards which are themselves mounted vertically onto the PC/AT board 30.

As locationally seen in FIG. 4B, the SCAMP board 30 is a single PC/AT-compatible board that holds the SCAMP processor 40, its memory subsystem 39, memory control 33 and Dual-In Line Memory Module 32. Highly sophisticated integration levels were required to house all the necessary logic on a single board, while still insuring all performance objectives, an operation which would normally provide difficulties in minimal design risk, a low-cost product and a rapid transfer to production. Thus a combination of various state-of-the-art integrated circuit technologies were combined to fulfill the objectives required.

This can be further observed with regard to FIG. 4B shows the physical layout of the SCAMP printed circuit board which covers an area approximately $3\frac{1}{2}$ inches by 11 inches.

Locationally shown in FIG. 4B is the board 30 with SCAMP processor 40 connected to the memory controller 33 adjacent to the DIMM vertical arrays 32.

The memory subsystem 39 (FIG. 4A) includes the maintenance logic $40_{mc}$, the bus arbitration and control logic $41_a$, and the bus interface logic $41_b$ (shown in FIG. 4A surrounded by the block designated 39). For these elements, user-programmable gate arrays often called Logic Cell Arrays, (LCA's) are used. Additionally the board 30 provides certain unused locations which are easily available for future options (FIG. 4B) to the system should they be desired.

Together, the SCAMP chip 40 and the condensed memory array 32 occupy about one-half of the space available on the printed circuit board 30, leaving about 27 square inches for the memory system control interface 33 and bus arbitration control logic $41_a$, the PC/AT bus interface logic $41_b$, the maintenance bus interface logic $40_{mc}$, and the on-board clock generator $40_k$ (FIG. 4A).

Experience from previous A-Series design work had shown that implementing this type of logic with the use of standard MSI logic devices (including programmable logic devices) would require at least 100 square inches of space. This type of problem and experience led to an investigation of possibilities of other available Very Large Scale Integrated (VLSI) technologies for application-specific integrated circuits (ASIC).

Semi-custom gate arrays could be designed to meet the desired integration and performance levels, but only at the risk of long and expensive design cycles. Notably certain portions of the design were well understood and entailed little risk, as for example, the memory control logic (such as 33) was well-proven in previous experience A-Series designs. However, other portions of the design required were much less certain at the outset and there was very little experience with the PC/AT hardware environment. Further, there had been no earlier attempts at integrating the newly developed type of SCAMP chip into a functional system. It appeared that long, trial-by-error design cycles might be required for adequate development.

Such difficult considerations narrowed the list of implementation choices to two possibilities: (1) use conventional mask-programmed gate arrays, but only after proving the design by prototyping the circuitry with standard logic devices, or (2) use a standard logic device capable of implementing the desired functions.

The second option seem to hold the promise of lower cost, reduced design risks and faster design cycles, but only if standard parts, that met the stringent criteria, could be found and identified. These type devices would have to feature high logic densities (much larger than conventional programmable logic devices PLD), plus low power consumption, low cost and still be available from multiple sources.

Project requirements involved certain development system capabilities which would include schematic design entry, in-circuit emulation, and complete timing analysis and simulation tools.

Parts and development tools had to be immediately available, and any selected component and its vendor would have to meet strict qualification requirements of the Unisys component evaluation and procurement organization standards. This complex situation was resolved by the selection and identification of a type of device known as "user-programmable gate arrays" such as made by Xilinx Corporation of San Jose, Calif.

The development of the memory subsystem 39 (shown in FIGS. 4A and 4B) involved the control and interface logic which was implemented with 2,000-gate user-programmable gate arrays. The Xilinx TM user-programmable gate arrays are also known as Logic Cell TM Arrays (LCA TM) and are similar to gate arrays in their architecture and capabilities, but are considerably more flexible in that they are fully "user-programmable".

Within an LCA as seen in the units 39 of FIG. 4B, there is an internal array of programmable logic blocks, each containing a combinatorial function generator and two flip-flops, which are used to implement the logic of the particular application. A periphery of programmable I/O blocks define the LCA's external pins as either inputs, outputs or bidirectional signals. Interconnections between the blocks also are fully programmable, permitting the implementation of any logic functions. Configuration of the device involved the programming of internal static memory cells; configuration programs thus can be down-loaded into the LCA (39) while it is resident in the system, being done either automatically as part of the system initialization sequence at power-up, or upon command at any time.

The design methodology for LCA's is similar, in many ways, to that of conventional gate arrays. Commercially available tools are used to enter, implement, and verify the design. During the SCAMP PC board design of FIG. 4B, the LCA logic was entered using the Future Net ® DASH TM schematic editor. "Future Net" is a registered trademark and "DASH" is a trademark of the Future Net Corporation.

Then a P-Silos TM logic simulator was used to perform a unit-delay simulation in order to verify the logic as entered. The term "P-Silos" is a trademark of the Simucad Corporation.

Then APR, Xilinx Automatic Place and Route software, and XACT TM, an interactive graphics editor, were employed to place the design into the specific LCA logic and I/O block and thus create the block interconnection. The terms Xilinx, Logic Cell, LCA, XACT, XACTOR, and Programmable Gate Array are trademarks of the Xilinx Corporation.

Upon completion of internal placement and routing, full timing simulation was performed, again using the P-Silos simulator. All of these development tools can be and were run on a PC/AT-compatible host.

Upon completion of the simulation, the design was tested in the target system using the XACTOR TM in-circuit debugger. Being similar to a "microprocessor in-circuit emulator", XACTOR allows the use of a special emulation LCA in the target application that can be controlled and monitored by the development system. This emulation capability proved extremely effective during the debugging operations; and most of the debugging problems were found to be timing-related so that the development system tools permitted quick identification of the critical timing paths and allowed the implementation of finding of the correct timing cycles.

Thus it was found that the "flexibility" provided by the logic cell arrays and the development tools therewith were one of the principal attractions of user-programmable gate array technology. Because of this, new design changes can be quickly implemented at any stage of the design cycle. When designing with custom ASIC technologies, design simulation, device testability and the generation of test vectors would each be of major concern.

The whole thrust involved was on a first-pass design success since significant delays and expenses result from design changes. However, it was noted that logic created in an LCA can be changed quickly and immediately tested in the target system, without seriously effecting cost or development schedules.

Due to the finding that the inherent flexibility of the logic control array contributed such efficiency, the understanding then arose that it would be useful to implement the memory control logic 33 with another gate array (designated the OAK [FIG. 4B]), thus minimizing the risk of design changes. Likewise if modifications were required in the OAK memory control, they could be implemented in the LCA portion of the interface circuitry.

For example, various problems and situations arose during the development of the Micro-A transition from preproduction to production phases. Since certain production versions of the gate array had different timing characteristic than the pre-production versions, it was necessary to be able to provide for modifications.

Both the set-up and the hold times for the inputs and the propagation delays for the outputs were effected, since differences of as much as 25 nanoseconds were discovered between preproduction and production phases. However, due to the flexibility of the system, rather than attempting to adjust the production-fabrication process for the gate array, the designers were able to compensate for the differences by altering the interface logic in the LCA between the SCAMP processor and the OAK gate array 33. Due to this flexibility, any required design modifications could be implemented, tested and released to production within three days or less. This alone justified the use of programmable gate arrays such as the Xilinx LCA.

The five user-programmable gate arrays, 39 of FIG. 4A, are loaded with configuration programs stored in three serial PROM's, resident at item 37, on the SCAMP board 30 of FIG. 4B. Optionally, the LCA's can be loaded with configuration programs from the system's disk drive, thus allowing the LCA's logic to be up-graded in the field much the same way as microprocessor code is distributed—with a floppy disk and upgrade in instructions.

The "flexibility" provided by the programmable gate arrays have the added advantage of aiding in any type of future product development along this line. For instance, major changes to the design's "personality", such as interfacing to a different host workstation, can be implemented through programming the LCA's with little or no change to the actual hardware involved.

As an added benefit, with the use of a standard user-programmable device such as the LCA, this assists the manufacturing process in controlling parts inventory, which is an especially important benefit with the present type of production facility which uses a "just-in-time" manufacturing philosophy.

In the design and development process, it was seen that a combination of technologies was utilized. Thus in order to meet the Micro-A's system performance goals, the well-proven portions of the memory control (33) and the processor support logic were effectuated in an 11,000-gate, 323-pin mask-programmed gate array. This CMOS gate array was designated as the "OAK" (33, FIG. 4B) by the development group and it contains the majority of the memory control logic 33, including error checking and correction circuitry (ECC), along with several other system functions such as: "Time-of-Day" logic, memory data and address registers, and special registers used by the maintenance subsystem $40_{mc}$.

As a result of the high logic integration levels provided by the OAK gate array 33, and the user-programmable gate arrays 39, the desired objective of implementing the Micro-A system on a single PC/AT board was met, with still remaining space for an extra gate array and an extra LCA socket, providing room for future upgrades and future options.

In FIG. 3B, there is seen a generalized block diagram indicating how a first personal computer system $70_s$ is integrated with a second computer system (A-Series system, 30).

The personal computer system $70_s$ is basically a desktop workstation which uses the housing and components provided in the Unisys PW2-800 workstation.

Mounted within the available housing space of the workstation is the SCAMP board 30 which operates as a complete A-Series computer system in its own right.

Thus, what is presented is a first computer system, the personal computer workstation system which is interconnected to a second computer system, the A-Series computer system which has been made to reside on a single printed circuit board of 4½ inches by 13½ inches. Situated on this internal PC board called the SCAMP board 30 is a 48-bit microprocessor (FIG. 5) located in the central die of the SCAMP chip 40 and designated $40_{ip}$. Surrounding this are ten sets of static RAM memory for holding the microprocessor microcode and are designated as $40_m$. The connection between the first computer system $70_s$ and the second computer system on the SCAMP board 30 is the PC bus 44 (FIG. 3B).

The SCAMP board 30 (FIG. 4B) thus contains the 48-bit microprocessor with its ten 250 KB static RAM chips plus the memory subsystem 39, the memory control gate array 33 and the dual-in-line memory modules 32 which permit the storage of 12 MB of main memory (2 megawords of 60 bits).

The PC workstation system $70_s$ is seen to provide the I/O subsystem 80 (FIG. 3B) which connects to the operator display terminal (ODT), a tape unit and a disk unit peripheral plus the system control subsystem 75 (SCS) which connects to a maintenance display terminal (MDT). Both the I/O 80 and the SCS 75 are connected by bus to the SCAMP drivers 85 which circuitry provide the connection and interface to the SCAMP board 30.

With reference to FIG. 3B, there is an integrated intercooperative arrangement between the PC system $70_s$ and the SCAMP board 30 (A-Series computer).

To initiate an input/output operation, the Master Control Program, (MCP) in memory block 34 and 36, constructs an I/O Control Block (IOCB) that describes the operation required and places the IOCB in a queue. The MCP then states the input/output operation in a standard fashion used in the A-Series computer systems. The SCAMP microcode $30_m$ then "packets" the relevant IOCB information and develops a message which it writes to the PC memory 52 of FIG. 3A. It also interrupts the PC processor 60 of FIG. 3A.

The interrupt is serviced by the SCAMP driver 85 (FIG. 3B) running on the PC system $70_s$. The message which was received, contains a function code which tells the SCAMP driver 85 to invoke the I/O connection module software, which is an emulation of the UIO Distribution Card and the Base Control Card. The Distribution Card and the Base Control Card are modules used in the A-Series systems which have been described in Unisys U.S. Pat. No. 4,280,193 entitled "Data Link Processor for Magnetic Tape Data Transfer System", included herein by reference.

The Connection Module (used in Unisys A-Series systems) reads the DLP address portion of the message and invokes the corresponding DLP emulator, which interprets the DLP command and starts the I/O operation via its I/O device driver 85. The DLP emulator is located in the I/O unit 80 of FIG. 3B.

The "A-Series" I/O output data is written to buffers in the PC memory 52 of FIG. 3A. This data is then sent to peripheral controllers such as the PC monitor 70, the datacomm unit 90, or the PC printer 100 of FIG. 3A.

The A-Series I/O input data is read into buffers in the PC memory 52 by the DLP emulators in the I/O unit 80 of FIG. 3B which then cause an interrupt to the SCAMP board 30 over the PC bus 42, FIG. 3A.

In FIG. 3B, the SCAMP microcode $30_m$ then reads the data from the PC memory 52 and writes the data into the SCAMP board memory 32 (RAM-DIMN) of FIG. 4B.

At the end of the I/O operation, the DLP emulator in the I/O unit 80 of FIG. 3B translates the PC-style result descriptor into a DLP-style result, and writes this result into the PC memory 52 while also interrupting the SCAMP board 30.

The SCAMP microcode $30_m$ is used to read the result from the PC memory 52 and write it into the IOCB result area in the SCAMP board memory 32. The SCAMP microcode $30_m$ then enqueues the IOCB into an area called the Result Queue and then interrupts the Master Control Program 36 in order to indicate the completion or incompletion of a particular cycle that was initiated.

With reference to FIG. 6, and also FIGS. 3A, 3B, the SCAMP board 30 provides the basic functionality of an E-Mode processor 40, and the E-Mode memory 32. The PC $70_s$ provides the functionality of the SCS 75 (System Control Subsystem) and I/O subsystem 80. The I/O subsystem 80 consists of an I/O interface mechanism and a set of, peripheral devices such as the operator display terminal 70 (ODT), the tape unit and the disk unit shown as part of the PC system $70_s$ of FIG. 3B.

As was previously described in U.S. Pat. No. 4,280,193 (Data Link Processor for Magnetic Tape Data Transfer System) and in U.S. Pat. No. 4,390,964 (Input/Output Subsystem Using Card Reader-Peripheral Controller) in regard to systems involving data link processors (DLP) and the use of the MLI (message level interface), host dependent port (HDP), connection modules and base modules, these functions have been emulated as seen in FIG. 6 by the use of software which replaces much of the previously required modular units used in the Unisys A-Series earlier systems.

For compatibility with current software, the generic I/O interface must be the existing Message Level Interface (MLI) and the DLP subsystem. To make this possible, the Connection Modules and the DLP's of FIG. 6 are emulated by tasks running on the PC with the PC bus 44 acting as a substitute for the MLI (Message Level Interface).

The SCS 75 (System Control Subsystem) functionality is provided by a different set of tasks running on the PC $70_s$, but also using the PC bus 44 as a physical communication mechanism.

During normal system operation, the SCAMP board 30, FIG. 3B, is master to the PC system $70_s$. Thus all operations are initiated by the SCAMP 30 and performed on demand by the PC $70_s$.

However, during maintenance operations, the PC $70_s$ is master to the SCAMP board 30, so that it must have direct control over the board's operation. Thus, although the PC bus 44 is the only physical interface, there are also two logical interfaces operating on it, which are the Operational Interface (used for I/O and other communication when the system is running) and the Maintenance Interface (used for direct SCAMP board 30 control during initialization and maintenance operations).

Operational activity for the peripherals is provided by various peripheral devices attached to the PC $70_s$, but which is dedicated to the A-Series environment. The data link processors (DLP's) communicate with the peripheral devices (FIG. 6) via PC-style device drivers which are personally adapted and proprietary to the Micro-A system.

The operating system is the Microsoft ® OS/2 which was chosen in preference to MS-DOS because it provides a rich set of process control and communication mechanisms for use in a large-memory, multi-tasking PC environment.

OS/2 provides the capability of different screen groups for different sets of applications. In the Micro-A environment, FIG. 3B, there are two such sets—(i) the SCS subsystem 75 and the (ii) I/O subsystem 80.

In the SCS screen group, the physical screen itself and the keyboard are part of the SCS menu system.

In the I/O subsystem, they are the screen and the keyboard for the operator display terminal (ODT).

Overall coordination of the screen groups and applications is performed by a process known as the "Administrator". This program maintains information about the configuration of the system, and oversees the system initialization process. Where necessary, the appropriate configuration information is passed on as parameters to the SCS process and the I/O process.

The SCAMP board 30 provides an E-Mode system environment which consists of the SCAMP chip 40, the E-Mode memory 32, plus processor support logic, the PC interface and the maintenance logic ($30_i$ and $30_t$, FIG. 3B). All of these components are contained on the single-style PC/AT expansion card of FIG. 4B.

The SCAMP chip 40 runs the generic A-style microcode, except that those parts responsible for external interfaces are modified to operate in the PC environment of system $70_s$.

The processor support logic includes the system clock, a time-of-day register, interval time strobe logic and processor control logic which are in the subsystem card area 39 of FIG. 4A. The area of FIG. 4A within the dotted-line area might be designated as the interface subsystem 39.

The PC Interface $30_i$ (PCI) consists of logic which allows the SCAMP 40 into Read/Write access to the PC memory 52 and the ability to send interrupts to the PC 60, FIG. 3A. This interface may be seen in FIG. 4A in the block $41_b$.

The maintenance logic $40_{mc}$ of FIG. 4A consists of a set of I/O-mapped PC bus registers. The PC $70_s$ can read or write their contents, and those contents can exert direct, low-level control over the SCAMP board 30.

The PC system $70_s$ environment consists of a set of concurrently operating tasks which provide the I/O subsystem 80 and the SCS 75 functionality.

The multiple-screen group mechanism of OS/2 provides a natural way to separate the functions of the SCS 75 and the I/O 80. Processes and threads along with semaphores, allow the construction of efficient, multitasking process units. Pipes, queues, and dynamic linked libraries allow for efficient interprocess communication. The Application Program Interface (API) allow for easy management of keyboard, screen, and operating system interfaces.

A separate, PC-style setup program is provided to load and to update the files maintained on the 19 (FIGS. 1 and 2) disk, PC, including the PC software, microcode, and E-Mode initialization programs (Bootstrap and Loader).

The I/O subsystem provides a method of emulating the message level interface (MLI) by using a different type of communication mechanism. This is done in software.

The SCAMP microcode is responsible for the construction and interpretation of the PC I/O messages which replace the normal message transactions on the message level interface (MLI).

The connection module of FIG. 6 is emulated by tasks running in the PC $70_s$. These tasks provide the functionality of a Line Expansion Module (LEM) and a Base Control Card (BCC).

The DLP's are also emulated by tasks running in the PC $70_s$. They are responsible for accepting DLP commands from the SCAMP 30, converting them into a PC-specific format, coordinating the "outboard" transfer of data and constructing and returning DLP result descriptors.

Data is transferred via buffers allocated in the PC memory 52 by the DLP's. All data transfer into and out of the A-Series E-Mode memory, 32, is done by the microcode. The microcode is responsible for the assembly and disassembly of 16-bit PC words to and from the required 48-bit and 58-bit E-Mode words.

The peripheral subsystem in FIG. 6 consists of a set of devices and device drivers capable of performing (with suitable DLP emulation) as standard A-Series I/O devices. The minimum set of devices is disk, tape, printers, datacomm, and operator display terminal (ODT). These devices are standard devices qualified in Unisys A-Series systems. The ODT is emulated by using the screen and the keyboard of the PC $70_s$.

Use is made of small computer system interface (SCSI) devices. Disk and tape functionality is provided by SCSI devices. This type of interface is very cost effective in the Micro-A environment and the SCSI devices have already been designed and qualified for other A-series systems. The use of the same interface for both disk and tape peripherals requires the development of only a single DLP which has been emulated.

The physical interface is provided by the SCSI expansion board which contains the required logic to manage low-level SCSI bus protocols and to interface with the PC $70_s$.

Peripherals such as printers can be attached in two different ways. for example, directly connected to the PC parallel port and/or connected via the datacomm board. Direct-connect printer functionality can be provided by using the existing OS/2 I/O driver mechanism to communicate with printers supported by the PC workstation PW2-800. Datacomm printer functionality is provided by using the appropriate protocols with the datacomm DC-DLP.

Datacomm functionality is provided by the datacomm expansion board. This contains the necessary processor and memory to handle line and station support logic as well as interfacing with the PC $70_s$. The DLP, running the PC, makes the board look like a standard Datacomm DLP (DC-DLP).

The SCS subsystem 75 of FIG. 3B provides two main sets of functionality—(i) support for the operating system and (ii) control over the E-Mode environment.

While the system is running, the SCS 75 responds in real time to a variety of commands from the SCAMP processor 40, for such things as reading the backup clock, shutting down the system, etc.

Whether the system is running or not, the SCS 75 allows for changing the E-Mode environment such as providing the following capabilities:

1. booting up the system and shutting it down;
2. starting and stopping the system via the E-Mode Suspend and Continue functions;
3. explicit loading and running of microcode and E-Mode programs;
4. access to and modification of E-Mode processor and memory state for system software debug.

In regard to maintenance, the operating environment of the Micro-A system 10 is the same as that of any other Unisys A-Series system. However, physically, the environment is that of a PC and the approach to maintenance parallels this distinction.

Hardware maintenance is performed via board-level self-test routine and board-level replacement. The end user can either diagnosis a problem to a failing board and replace the board on site, or take the system to a repair facility, where more detailed diagnostic routines are provided.

With an appropriate modem connected to the system, the user can dial up a remote support center for transmittal of software patches.

In the design process of the Micro-A desktop computer, the Unisys Personal Workstation PW2-800 which used the Intel 80386 microprocessor had been selected as the base unit; it then evolved into a question as what operating system could provide the best environment for developing and executing the software components of the system.

Additionally, there was developed in software, a cooperative set of processing elements which emulated the Input/Output (I/O) subsystem structure of the standard A-Series Unisys mainframes.

While most of the standard A-Series mainframes involve I/O subsystems, implemented in hardware, it was now decided to implement the Micro-A I/O subsystem as separate software processors. These processors would run on the PW2-800 host operating system and utilize the features of that operating system for inter-process communication and interactions with external devices. If an operating system did not have the features of multi-tasking and inter-process communications, this would force the designers to add all of these extra capabilities additionally which would lengthen the design and implementation of the desktop computer project.

It was also a requirement that the operating system selected would be useful with a wide variety of input/devices, both presently in existence and future types of devices. Thus an operating system was required which had industry-wide support as a standard system. It was also necessary that there be support for a full range of features, including text and graphics screen presentation capabilities, and the operating system should be one that is commercially available for the PW2-800 workstation.

Thus, the Microsoft OS/2 operating system was found to be the system very well matched to the task. This operating system could meet the need for critical requirements and use an operating system that the PW2-800 workstations were committed to.

Figure 7A:
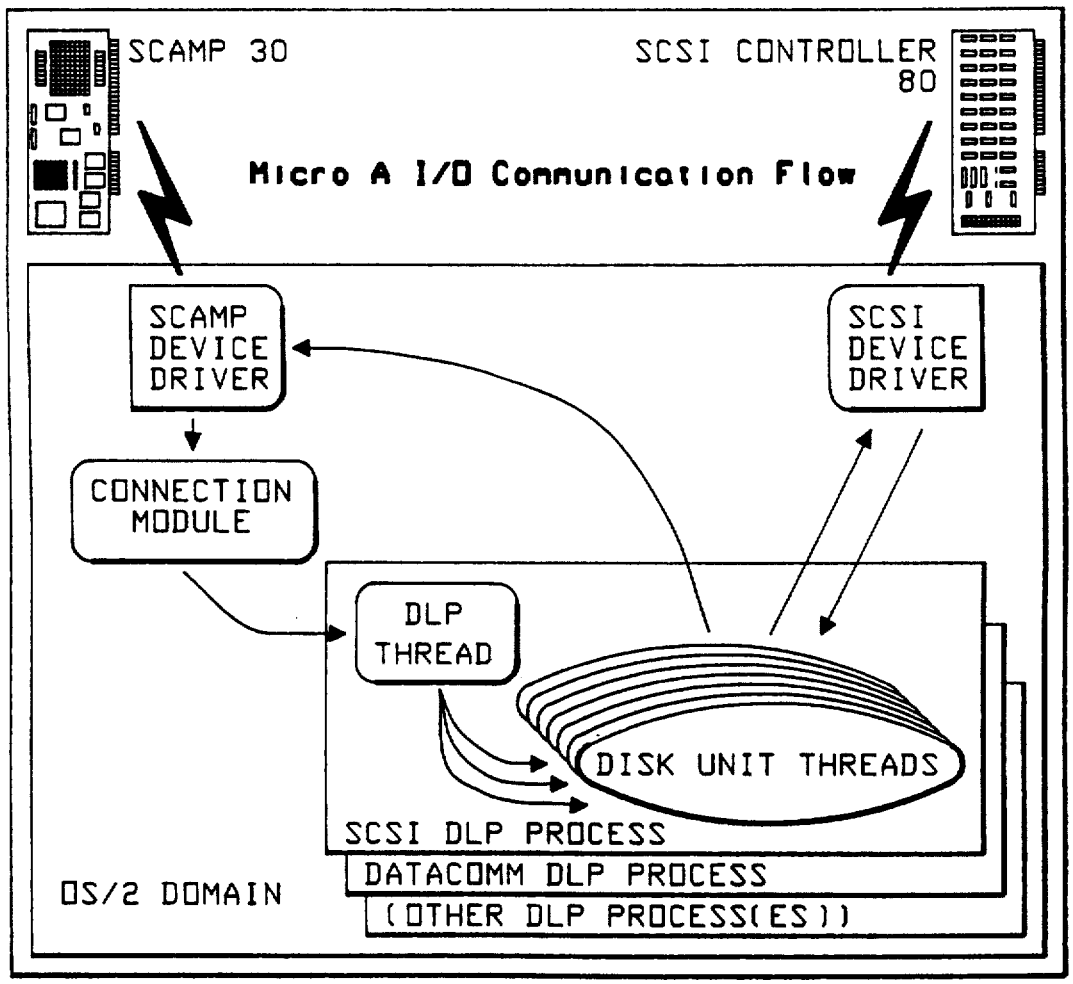
FIG. 7A is a representational drawing of the Micro-A system's communications flow.

In FIG. 7A there is seen an overview of a major components of the Micro-A input/output (I/O) subsystem which illustrates the message flow between the single-chip A-Series microprocessor (SCAMP) board and the small computer systems interface (SCSI) 80 disk controller inside the personal workstation PW2-800.

The following discussion will indicate how these components interact to move data between the personal workstation PW2-800 and the A-Series computer in the SCAMP board 30.

The OS/2 operating system involves pipes, processors, and threads which are described in a book entitled *INSIDE OS/2* by Gordon Letwin and published in 1988 by the Microsoft Press.

The SCAMP board 30 contains the SCAMP microprocessor $40_{ip}$ (FIG. 5) which is responsible for processing the A-Series object code instructions. The SCAMP printed circuit board 30 is inserted into one of the 16-bit expansion slots inside of the PW2-800 workstation. The SCAMP microprocessor $41_{ip}$ is the heart of the system and is driven by a series of elementary instructions called the "microcode". The SCAMP microcode which resides in the memories $40_m$ on the SCAMP module $40_p$ (FIG. 5) defines and controls the execution of the A-Series operators. The SCAMP microcode contains special capabilities dealing with the memory and architecture of the PW2-800 workstation, allowing it to read and write into/out of the personal workstation memory 52 at will.

On the personal workstation side, the reverse is not true since the personal workstation does not access the A-Series memory on the SCAMP board 30. Processes on the personal workstation, which wish to pass information to the SCAMP board 30 must follow a certain set of interface rules set forth by the system design. These rules ultimately lead to action by the SCAMP board to dequeue requests directly from a structure in the personal workstation's memory.

The I/O instructions are translated into one or more messages and hardware interrupts for the personal workstation PW2-800 by the SCAMP microcode when an I/O operation is initiated or terminated. Software running on the personal workstation, can generate messages for the SCAMP 30 by queueing a message for the SCAMP microcode and raising a signal through one of the Intel 80386's hardware ports which results in a SCAMP interrupt. This is effectuated by use of the SCAMP device driver, seen in FIG. 7A.

The I/O interface remains transparent to A-Series software. In this way, the Micro-A desktop computer is a full-fledged member of the A-Series family of computers. The object code of software written for the Micro-A desktop computer is usable equally well on other Unisys A-Series computer systems including the large-scale A-15 system.

SCAMP Device Driver: The SCAMP device driver is an OS/2 software device driver which allows the SCAMP board 30 to communicate with the OS/2 processes. This device driver links the SCAMP board 30 to the rest of the I/O subsystem which is executing under OS/2.

The SCAMP device driver cooperates with the SCAMP microcode to manage a shared structure in the personal workstation memory called the Control Area. This structure, shown in FIG. 7B contains information which is related to interrupt-handling and message-passing activity which occurs between the SCAMP board 30 and the personal workstation $70_s$, and is allocated and initialized by the SCAMP device driver 85 when it is first loaded.

The Micro-A computer system Control Area is a structure in the memory of the personal workstation which is shared by the microcode of the SCAMP module $40_p$ and the SCAMP board device driver 85 working under the operating system OS/2. The Control Area contains information about interrupts caused by the SCAMP processor $41_{ip}$ and the addresses of the other important structures in the personal workstation memory such as areas indicated in FIG. 7B as SCAMP-to-Personal Workstation, messages and the Personal Workstation-to-SCAMP message queues.

Figure 7B:
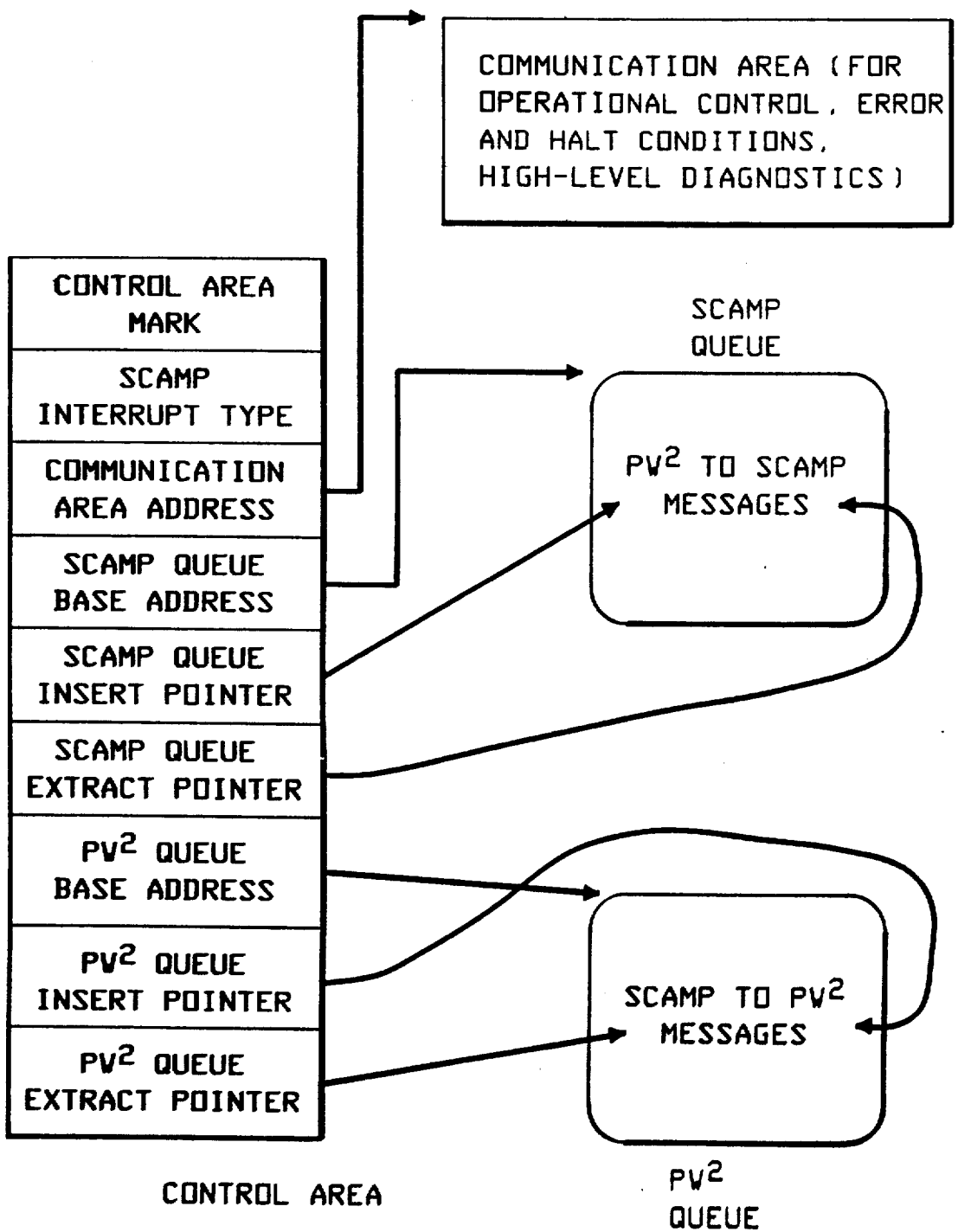
FIG. 7B outlines the control area structure in the personal workstation.

FIG. 7B shows the format of the Micro-A Control Area. The SCAMP device driver dequeues messages from the SCAMP processors via the personal workstation Queue pointers of the Control Area upon receipt of a hardware interrupt from the SCAMP microcode. Similarly, it uses the SCAMP Queue pointers to queue messages for the SCAMP processors which will be analyzed by the SCAMP microcode, and generates an interrupt on the SCAMP processor.

The communication area shown in FIG. 7B is utilized for operational control, error, failure and halted conditions of the SCAMP, for high-level diagnostics, and to contain the message areas for special A-Series operators such as the SHOW operator. The SHOW operator is used, for example, while the master control program (MCP) is initializing in order to display the progress of the initialization process. This produces messages on the system console during system initialization.

Connection Module: The connection module (CM) is a OS/2 process which fetches incoming messages from the SCAMP device driver and routes them to the appropriate destination of an emulated Data Link Processor. The connection module functions primarily as a central switching facility, but it can perform other duties as well, such as handling a single "master clear" request from the MCP by generating selective clears for each active DLP period.

The connection module (CM) plays a critical role in the Micro-A computer's I/O subsystem, since it is the only component which calls the SCAMP device driver to obtain messages from the SCAMP processor.

The various types of messages, which are routed via the CM, are each 32 bytes in length. Aside from message transfers, the only data copying which is performed by any component of the I/O subsystem is a memory-to-memory copy which comes when the SCAMP processor must move data between the personal workstation memory 52 and its own memory 32. The information contained in the messages includes a reference to any actual data to be read or written so that it is always available to those components of the Micro-A I/O subsystem which require knowledge of the physical location of the data.

DLP and Unit Threads: The Data Link Processors (DLP's) have responsibilities to their hardware DLP counterparts. In the Micro-A I/O subsystem, each DLP is implemented as a separate OS/2 process.

The OS/2 threads are similar to Algol processes on A-Series Unisys systems. Each thread executes independently of other threads and the parent process, while sharing data which is determined by the scope of the parent process. Protecting data from multiple, simultaneous writers, usually entails the use of a locking mechanism with serialized access to the data, thereby insuring the integrity of the information.

In the case of the SCSI DLP of FIG. 7A, each DLP process is further subdivided into one general-purpose DLP thread and unit thread for each individual disk device. For each SCSI DLP, the Micro-A computer system can support up to seven disk units, so up to seven unit threads would be executed to service the disk units.

The parent DLP process executes the required number of unit threads and itself becomes the general purpose DLP thread for that particular DLP. The DLP thread is responsible for performing global DLP functions such as stopping, starting, and terminating the unit threads. The DLP thread obtains all commands via an OS/2 pipe from the Connection Module. Since most messages are targeted to specific devices, it is this thread's responsibility to route device-specific requests to the unit thread to which each device is assigned.

The DLP thread controls and communicates with the unit threads through a two-dimensional "concurrent operation table" (COT) which is accessible by both the DLP process and the unit threads. The COT table is similar in function to the unit queues of one of its hardware counterpart DLP's. It is the COT table which maintains thread state information and pointers to the actual buffers into which information will be read from the disk, or written to the disk by the SCAMP processor $40_{ip}$.

The COT table contains one entry for each unit read and one entry for the DLP thread. OS/2 semaphores are used to control access to the COT table structure and by the DLP thread to awaken the appropriate unit thread when a request is made for the device managed by that thread.

SCSI Device Driver: One aspect of the Micro-A computer I/O subsystem is its ability to utilize devices which were designated for the personal workstation PW2-800 and its compatibles. One example of this is the SCSI Disk Controller. Since the personal workstation uses a standard bus interface which is compatible with the IBM AT family of microcomputers, the Micro-A designers were able to evaluate off-the-shelf SCSI disk controllers to select the one best qualified for compatibility, reliability and performance.

The SCSI Device Driver illustrated in FIG. 7A, is an OS/2 device driver which provides a link between the OS/2 processes and the SCSI Disk Controller Board 80 (FIG. 3A). The SCSI Device Driver frees the OS/2 application from dealing with hardware-specific low-level interfaces, allowing the application to make I/O requests in a straight-forward manner.

In the Micro-A computer I/O subsystem, the SCSI DLP unit threads can communicate directly with the SCSI Device Driver. When disk operations are requested from the SCS controller 80, the SCSI Device Driver typically suspends the requesting unit thread until the operation is complete. Since each unit thread is responsible for dealing only with one disk unit to which it is assigned, this process permits each disk unit to function independently.

Message Cycles: (FIG. 7A) Each disk I/O read and write operation causes two cycles of messages to flow between the SCAMP driver and the SCSI DLP unit threads. For a (write) operation, the SCAMP driver must request the unit thread for a buffer in which to place the data to be written. A "write data request" message must flow through the connection module (CM) and the DLP thread to the unit thread. To acknowledge this request from the SCAMP processor, the unit thread responds directly to the SCAMP Device Driver. After the SCAMP processor transfers the data to the personal workstation, it issues an "acknowledge data transfer" message which similarly must be routed to the unit thread which made the original request. Only after the unit thread receives such an acknowledgement, can it call the SCSI device driver to perform the actual disk I/O operation. At the termination of the physical disk I/O, the unit thread reports the completion directly to the SCAMP Device Driver.

For a (read) operation, the SCAMP processor issues a "read data request" which is routed to the unit thread controlling the target disk device. The unit thread will allocate the necessary buffer and immediately request the SCSI Device Driver to command the disk device to perform the requested read. At the completion of the read, the unit thread will notify the SCAMP Device Driver of the completion of the I/O operation directly. The SCAMP processor will then copy the information from the personal workstation memory 52 to its own memory 32 and return an acknowledge "data transfer" message to the unit thread. Upon receipt of this acknowledgement, the unit thread will call the SCAMP Device Driver directly in order to report an I/O completion.

The SCAMP processor guarantees that there will never be more than one active I/O operation to a disk device at any one moment in time. Therefore, there will never be more than one outstanding message for any given disk unit for any one moment.

Mainframe-Parallelism: The Micro-A I/O subsystem allows the SCAMP processor to function in parallel with the I/O activities controlled by the OS/2 software components. This is one of the "mainframe-like" aspects of the Micro-A computer system which, in addition to the powerful A-Series operating system features, truly places the Micro-A computer system in a unique category.

A Micro-A I/O subsystem performance model provides evidence of the manyfold possibilities inherent in the flexibility of the design. Wide varieties of future configurations are presented for feasible capabilities. These configurations may be enhanced to provide higher performance and additional feature content in order to meet the growing demands of computer users.

Thus, the Micro-A desk-top computer system provides for a large variety of mainframe capabilities while maintaining the small footprint of a desk-top computer module, and which not only provides compatibility with previous Unisys A-Series mainframe computers, also permits the simplified design expansion in future capabilities for meeting the needs of sophisticated computer users.

Described herein has been a small, portable, desk-type computer having mainframe capabilities, but which requires no special air conditioning or power requirements other than the normal room facilities. This Micro-A desk-top-computer-system module provides for the intercooperation of a personal workstation computer system together with the Unisys A-Series computer system in its most miniaturized version while permitting all the features and capabilities of a mainframe configuration.

With the use of the OS/2 operating system, the former hardware models of the Data Link Processors used in the I/O subsystem of the Unisys A-Series, have now been emulated in software so as to eliminate the need for large-size printed circuit boards holding multiple numbers of integrated circuit chips.

While various functions and components of the Micro-A computer system module have been known in the computer arts, it will be seen that the combinative effect of the newly developed components and their specialized features, which are housed in a small footprint desk-top module, provide for a unique combination of elements and features which are defined in the claims attached hereinbelow.

What is claimed is:
1. A desktop computer system having mainframe capability and enabling concurrent operation of multiple computer means comprising:
  (a) a first computer means acting as a host and having a first dedicated memory means and first central processing unit and operating on a first operating system, said first dedicated memory means provided program storage for said first operating system and for application programs applicable to said first computer means and for storing I/O commands from a second computer means, said first computer means including:
     (a1) server means for emulating the I/O commands transmitted from said second computer means into said first dedicated memory means so that said I/O commands are translated into a compatible format for said first computer means to enable data transfer operations between said second computer means and peripheral devices;
  (b) said second computer means acting as an auxiliary concurrently operating computer having a second dedicated memory means and second processing unit and operating on a second operating system, said second dedicated memory means providing program storage for said second operating system and for application programs using said second operating system, said second computer means including:
     (b2) means for writing into or reading out of said first dedicated memory means.

2. The system of claim 1 wherein said peripheral devices include:
  (f1) a screen monitor unit;
  (f2) an internal disk unit;
  (f3) an internal tape unit.

3. The system of claim 1 wherein said first and second computer means are housed in a desktop cabinet having a footprint of less than 3 square feet and height less than 6 inches.

4. The system of claim 3 wherein said second computer means includes a second central processing unit (CPU), a memory control unit, said second dedicated memory means and an interface logic subsystem on a printed circuit board of less than 51 square inches in area.

5. The combination of claim 4 wherein said second central processing unit (CPU) includes a microcode memory on an integrated circuit chip module of less than 4 square inches in area.

* * * * *